United States Patent
Subhedar et al.

(10) Patent No.: US 9,839,301 B2
(45) Date of Patent: Dec. 12, 2017

(54) MATTRESS MANUFACTURING PROCESS AND APPARATUS

(71) Applicant: DREAMWELL, LTD., Las Vegas, NV (US)

(72) Inventors: Vinit V. Subhedar, Norcross, GA (US); Gregory Fowler, Alpharetta, GA (US); Francis Jan, Atlanta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 0 days.

(21) Appl. No.: 15/003,944

(22) Filed: Jan. 22, 2016

(65) Prior Publication Data

US 2016/0213163 A1    Jul. 28, 2016

Related U.S. Application Data

(60) Provisional application No. 62/106,949, filed on Jan. 23, 2015.

(51) Int. Cl.

| | |
|---|---|
| *B29C 65/48* | (2006.01) |
| *A47C 27/15* | (2006.01) |
| *B05B 12/12* | (2006.01) |
| *B05B 13/04* | (2006.01) |
| *B68G 7/05* | (2006.01) |
| *F16B 11/00* | (2006.01) |
| *B29L 31/00* | (2006.01) |

(52) U.S. Cl.
CPC ............ *A47C 27/15* (2013.01); *B05B 12/122* (2013.01); *B05B 13/04* (2013.01); *B29C 65/48* (2013.01); *B68G 7/051* (2013.01); *F16B 11/006* (2013.01); *B29L 2031/751* (2013.01)

(58) Field of Classification Search
CPC ..... A47C 27/05; A47C 27/056; A47C 27/064; A47C 27/15; B29C 65/40; B29C 65/42; B29C 65/48; B29C 65/4815; B32B 41/00
USPC ................. 156/356, 357, 367, 378, 379
See application file for complete search history.

(56) References Cited

U.S. PATENT DOCUMENTS

| | | |
|---|---|---|
| 1,685,160 A | 10/1901 | Marshall |
| 1,706,267 A | 3/1929 | Van De Mark et al. |
| 1,733,660 A | 10/1929 | Gail |
| 2,604,210 A | 7/1952 | Boone |
| 3,279,631 A | 10/1966 | McCartney |
| 3,689,106 A | 9/1972 | Young |
| 3,720,329 A | 3/1973 | Gamble |
| 3,885,691 A | 5/1975 | Knapp |

(Continued)

FOREIGN PATENT DOCUMENTS

| | | |
|---|---|---|
| CH | 683840 A5 | 5/1994 |
| DE | 2856600 A1 | 7/1980 |

(Continued)

OTHER PUBLICATIONS

Translation of DE 3540233 A1, Josef Rosier, puublished May 14, 1985.*

(Continued)

*Primary Examiner* — George Koch
(74) *Attorney, Agent, or Firm* — Cantor Colburn LLP

(57) ABSTRACT

A process and apparatus for manufacturing a mattress generally includes an automated foam layer placement apparatus for accurately securing one or more foam layers onto an innercore unit and bucket assembly.

9 Claims, 16 Drawing Sheets

(56) References Cited

U.S. PATENT DOCUMENTS

| | | |
|---|---|---|
| 3,934,740 A | 1/1976 | Rumell |
| 4,000,870 A | 1/1977 | Davies |
| 4,020,959 A | 5/1977 | Livesay |
| 4,049,286 A | 9/1977 | Francis, Jr. |
| 4,234,983 A | 11/1980 | Stumpf |
| 4,234,984 A | 11/1980 | Stumpf |
| 4,274,168 A | 6/1981 | Depowski |
| 4,355,940 A | 10/1982 | Derickson |
| 4,439,977 A | 4/1984 | Stumpf |
| 4,451,946 A | 6/1984 | Stumpf |
| 4,523,344 A | 6/1985 | Stumpf |
| 4,541,768 A | 9/1985 | Walker et al. |
| 4,565,046 A | 1/1986 | Stumpf |
| 4,578,834 A | 4/1986 | Stumpf |
| 4,787,808 A | 11/1988 | Shimoji et al. |
| 4,806,061 A | 2/1989 | Fenton |
| 4,832,185 A | 5/1989 | Huber |
| 4,839,933 A | 6/1989 | Plewright et al. |
| D303,030 S | 8/1989 | Goldston |
| 4,873,732 A | 10/1989 | Perez |
| 4,995,162 A | 2/1991 | Betere |
| 5,161,844 A | 11/1992 | Zimmer et al. |
| 5,326,212 A | 7/1994 | Roberts |
| 5,478,190 A | 12/1995 | Helton |
| 5,495,809 A | 3/1996 | Carbo |
| 5,613,287 A | 3/1997 | St. Clair |
| 5,621,935 A | 4/1997 | St. Clair |
| 5,704,624 A | 1/1998 | Davis |
| 5,746,877 A | 5/1998 | Notheis et al. |
| 5,934,041 A | 8/1999 | Rudolf et al. |
| 6,079,941 A | 6/2000 | Lee |
| 6,178,723 B1 | 1/2001 | Mossbeck |
| 6,273,257 B1 | 8/2001 | Mossbeck |
| 6,386,560 B2 | 5/2002 | Calender |
| 6,817,578 B1 | 11/2004 | Garcia et al. |
| 6,860,493 B2 | 3/2005 | Orozco |
| 7,007,790 B2 | 3/2006 | Brannon |
| 7,383,676 B1 | 6/2008 | Schmidt |
| 7,465,143 B1 | 12/2008 | Adams |
| 7,731,206 B2 | 6/2010 | Borrmann |
| 7,731,207 B2 | 6/2010 | Santos Gómez |
| 8,042,829 B2 | 10/2011 | Hailston et al. |
| 8,104,807 B2 | 1/2012 | Maffeis |
| 8,596,611 B1 | 12/2013 | Fountain |
| 8,851,488 B2 | 10/2014 | Carruyo |
| 8,979,099 B1 | 3/2015 | Ellis |
| 9,192,266 B2 | 11/2015 | Starr et al. |
| D744,713 S | 12/2015 | Della Polla |
| 9,216,752 B1 | 12/2015 | Carruyo |
| 2004/0061267 A1 | 4/2004 | Brown |
| 2004/0227086 A1 | 11/2004 | Haug et al. |
| 2004/0261186 A1 | 12/2004 | Gladney |
| 2007/0214625 A1* | 9/2007 | Brown ............... B68G 7/05 29/91.1 |
| 2008/0012260 A1 | 1/2008 | Ouyang et al. |
| 2008/0149030 A1* | 6/2008 | Klein ............... B05C 11/1034 118/665 |
| 2010/0071136 A1 | 3/2010 | Weber |
| 2010/0072676 A1 | 3/2010 | Gladney et al. |
| 2010/0281666 A1 | 11/2010 | Tseng |
| 2012/0091688 A1 | 4/2012 | Fink |
| 2015/0203221 A1 | 7/2015 | Van De Hey et al. |

FOREIGN PATENT DOCUMENTS

| | | |
|---|---|---|
| DE | 3540233 A1 | 11/1985 |
| DE | 4307142 C1 | 5/1994 |
| DE | 202012100849 U1 | 5/2012 |
| DE | 102011083451 A1 | 3/2013 |
| EP | 2316783 A1 | 10/2009 |
| EP | 2147775 A2 | 1/2010 |
| JP | S59162056 U | 10/1984 |
| JP | 2005333827 A | 12/2008 |
| WO | 9627553 A1 | 12/1996 |
| WO | 2009103173 A1 | 8/2009 |
| WO | 2013041894 A1 | 3/2013 |

OTHER PUBLICATIONS

Translation of CH 683840 A5, Antonio Betere Cabeza, puublished May 31, 1994.*

Notification of Transmittal of the International Search Report and the Written Opinion of the International Searching Authority, or the Declaration, issued in International Application No. PCT/US2016/014473, dated Apr. 4, 2016; 5 pages.

Notification of Transmittal of the International Search Report and the Written Opinion of the International Searching Authority, or the Declaration, issued in International Application No. PCT/US2016/014476, dated Apr. 4, 2016; 10 pages.

Written Opinion of the International Searching Authority, issued in International Application No. PCT/US2016/014473, dated Apr. 4, 2016; 6 pages.

Written Opinion of the International Searching Authority, issued in International Application No. PCT/US2016/014476, dated Apr. 4, 2016; 10 pages.

Notification of Transmittal of the International Search Report and the Written Opinion of the International Searching Authority, or the Declaration, issued in International Application No. PCT/US2016/014480, dated Jun. 21, 2016; 5 pages.

Written Opinion of the International Searching Authority, issued in International Application No. PCT/US2016/014480, dated Jun. 21, 2016; 6 pages.

Goldman R.P., et al: "A Constraint-Based Scheduler for Batch Manufacturing," IEEE Expert, IEEE Service Center, New York, NY, US. vol. 12, No. 1: Jan. 1, 1997, pp. 49-56, XP000689724.

Notification of Transmittal of the International Search Report and the Written Opinion of the International Searching Authority, or the Declaration, issued in International Application No. PCT/US2016/014474, dated Apr. 19, 2016; 6 pages.

Notification of Transmittal of the International Search Report and the Written Opinion of the International Searching Authority, or the Declaration, issued in International Application No. PCT/US2016/014482, dated Apr. 20, 2016; 6 pages.

Notification of Transmittal of the International Search Report and the Written Opinion of the International Searching Authority, or the Declaration, issued in International Application No. PCT/US2016/014525, dated Apr. 8, 2016; 11 pages.

Notification of Transmittal of the International Search Report and the Written Opinion of the International Searching Authority, or the Declaration, issued in International Application No. PCT/US2016/014576, dated Apr. 25, 2016; 4 pages.

Written Opinion of the International Searching Authority, issued in International Application No. PCT/US2016/014474, dated Apr. 19, 2016; 6 pages.

Written Opinion of the International Searching Authority, issued in International Application No. PCT/US2016/014482, dated Apr. 20, 2016; 6 pages.

Written Opinion of the International Searching Authority, issued in International Application No. PCT/US2016/014576, dated Apr. 25, 2016; 6 pages.

Notification Concerning Transmittal of Copy of International Preliminary Report on Patentability (Chaper I of the Patent Cooperation Treaty), issued in International Application No. PCT/US2016/014473, dated Aug. 3, 2017; 8 pages.

Notification Concerning Transmittal of Copy of International Preliminary Report on Patentability (Chaper I of the Patent Cooperation Treaty), issued in International Application No. PCT/US2016/014474, dated Aug. 3, 2017; 8 pages.

Notification Concerning Transmittal of Copy of International Preliminary Report on Patentability (Chaper I of the Patent Cooperation Treaty), issued in International Application No. PCT/US2016/014476, dated Aug. 3, 2017; 7 pages.

Notification Concerning Transmittal of Copy of International Preliminary Report on Patentability (Chaper I of the Patent Coopera-

(56) References Cited

OTHER PUBLICATIONS tion Treaty), issued in International Application No. PCT/US2016/014480, dated Aug. 3, 2017; 8 pages.
Notification Concerning Transmittal of Copy of International Preliminary Report on Patentability (Chaper I of the Patent Cooperation Treaty), issued in International Application No. PCT/US2016/014482, dated Aug. 3, 2017; 8 pages.
Notification Concerning Transmittal of Copy of International Preliminary Report on Patentability (Chaper I of the Patent Cooperation Treaty), issued in International Application No. PCT/US2016/014525, dated Aug. 3, 2017; 9 pages.
Notification Concerning Transmittal of Copy of International Preliminary Report on Patentability (Chaper I of the Patent Cooperation Treaty), issued in International Application No. PCT/US2016/014576, dated Aug. 3, 2017; 7 pages.

* cited by examiner

MATTRESS MANUFACTURING PROCESS AND APPARATUS

CROSS-REFERENCE TO RELATED APPLICATIONS

This application is a NON-PROVISIONAL of and claims the benefit of U.S. Application No. 62/106,949, filed Jan. 23, 2015, which is incorporated herein by reference in its entirety.

BACKGROUND

The present disclosure generally relates to mattress manufacture, and more particularly, to an automated foam layer placement apparatus for accurately securing one or more foam layers onto an innercore unit and bucket assembly.

Current processes for manufacturing the mattress include numerous steps utilizing manual labor including, among others, the process of adhesively securing one or more foam top layers, i.e., topper layers, onto a top surface provided by innercore unit and foam encased bucket assembly. For example, as shown in prior art FIG. 1, a typical process flow 10 for placing and gluing a foam layer onto an innercore unit and foam encased bucket assembly includes one or more operators physically applying adhesive to the top surface of the innercore unit and bucket assembly. Generally, this requires a first step 12 of applying (e.g., spraying) the adhesive onto the top surface of the assembly. Once the adhesive is applied, the one or more operators locate the desired foam layer for placement as shown in step 13. The operators then lift and carry the foam layer, and place the foam layer onto the innercore unit and bucket assembly as provided in step 14. As shown in step 15, the operators then manually stretch certain portions of the foam layer so as to completely cover any underlying top surface of the innercore unit and bucket assembly. Likewise, portions of the foam layer that extend beyond the top surface of the innercore unit and bucket assembly are lifted and realigned with an edge of the top surface. The operators then smooth out the surface and may push down on the foam layer to insure sufficient contact with the applied adhesive as provided in step 16. If the mattress build specifications require additional foam layers, the operators then locate the particular foam layer and repeat the above described process as provided in step 17.

Not surprisingly, the above process has inherent variability as these particular steps are operator driven and manually performed. Application of the adhesive itself can vary across the top surface of the innercore unit and bucket assembly since the amounts are not regulated leading to frequent instances of inadequate adhesive as well as excessive application. Inadequate glue as well as variability across the surface can lead to failures, which directly affect quality. Excessive adhesive application, translates directly to increased costs. Moreover, the time to perform the above described processes can be lengthy and can be a source of error when the wrong foam layer is located and placed. Still further, any pressure applied by the operator is highly variable.

BRIEF SUMMARY

Disclosed herein are processes and systems for manufacturing a mattress. The process for accurately securing one or more foam layers onto an innercore unit and bucket assembly comprises automatically sizing the foam layer by compressing and stretching the foam layer to define a nominal size; automatically applying an adhesive to a top surface of an innercore unit and bucket assembly; automatically aligning the inner core unit and bucket assembly to a base corner datum; and automatically lifting and placing the foam layer onto the top surface of the innercore unit and bucket assembly using the base corner datum as a reference point.

An automated system for placing and securing one or more foam layers onto an innercore unit and bucket assembly is also disclosed, The system comprises an adhesive application station for receiving an innercore unit and bucket assembly, the adhesive application station comprising a movable surface to support the innercore unit and bucket assembly and a bridge spaced from and spanning the movable surface, the bridge comprising one or more adhesive applicators oriented to discharge a controlled amount of adhesive in a defined pattern onto the a surface of the innercore unit and bucket assembly; an innercore unit and bucket assembly alignment station comprising a movable surface and an adjustable frame assembly configured to align the innercore unit and bucket assembly to a known datum point on the movable surface; a foam pick and placement station comprising a sizing table configured to compress and stretch the one or more foam layers to a nominal size; a lifting assembly comprising a plurality of lifting units spaced about an adjustable frame assembly so as to provide lifting and release of the foam layer from the sizing table when in use, and a robotic arm coupled to the adjustable frame assembly and configured to move the adjustable frame assembly from the sizing table to the innercore unit and bucket assembly alignment station; and a compression station comprising a vertically adjustable platen spaced above a movable surface.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

Prior Art Figure (FIG.) 1 depicts an exemplary process flow for manufacture of foam topper layers onto an innercore unit and bucket assembly.

DETAILED DESCRIPTION

Figure 1:
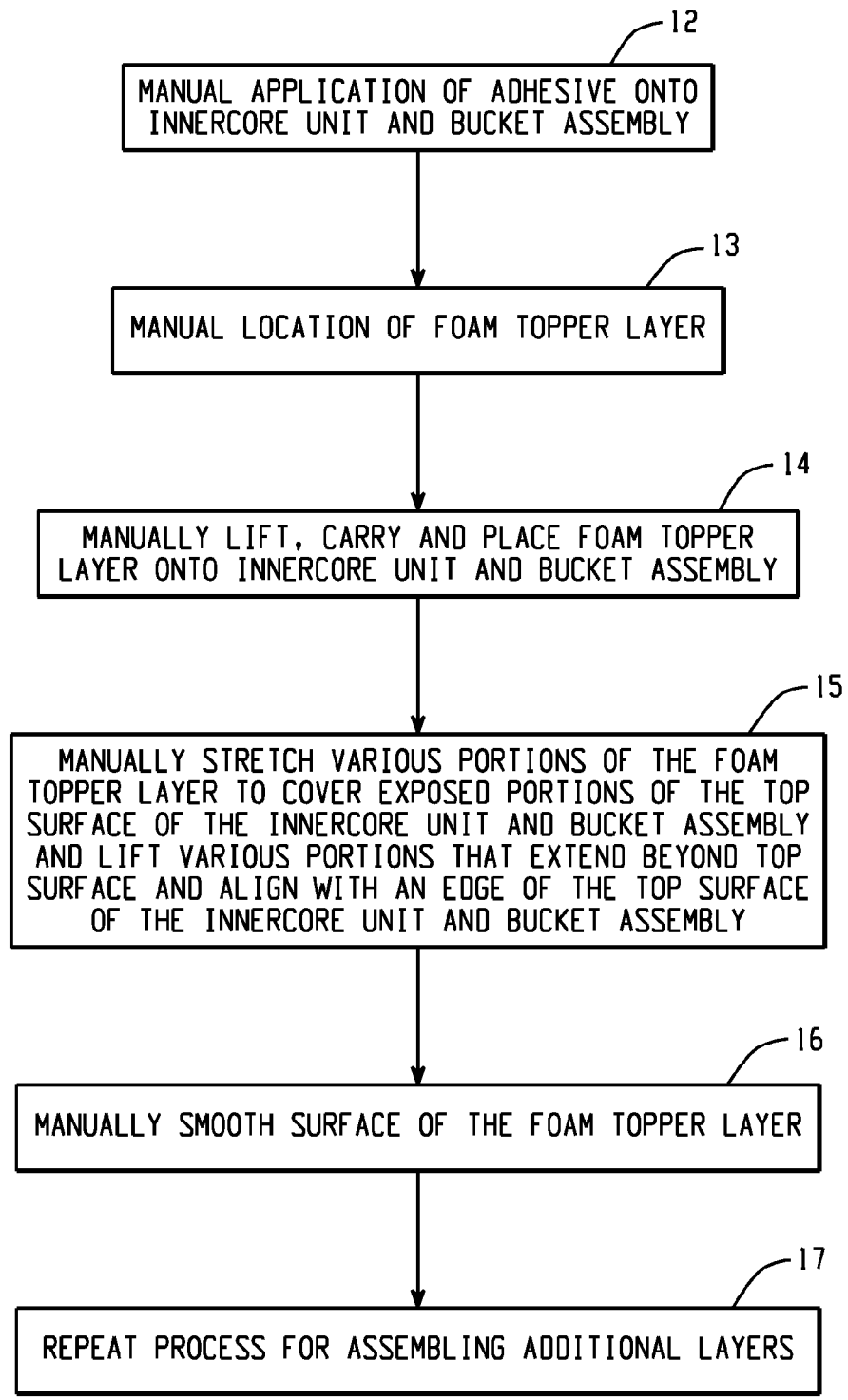
Figure 2:
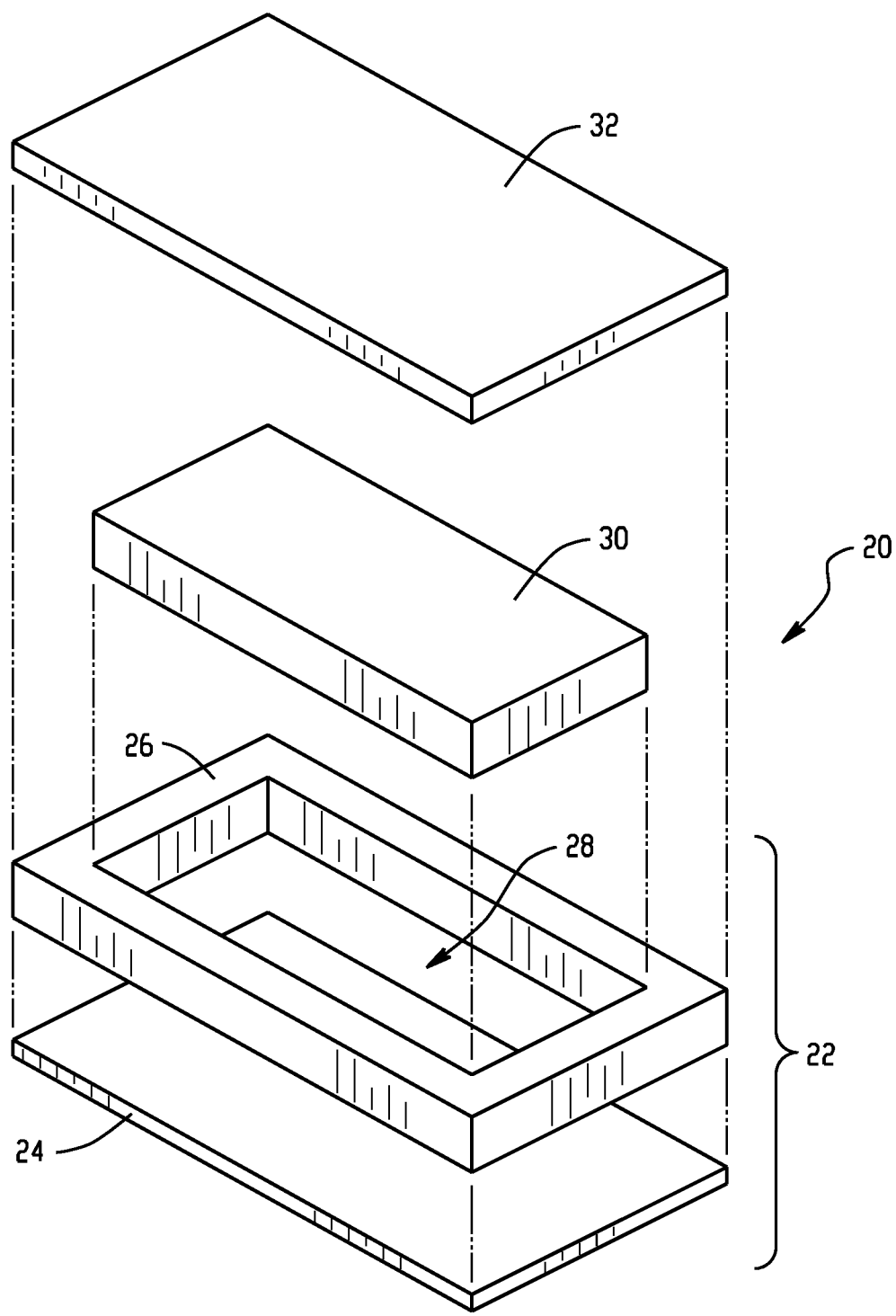
FIG. 2 illustrates an exploded perspective view of an exemplary assembled innercore unit and bucket assembly including a foam topper layer disposed thereon.

Disclosed herein are an apparatus and automated process for accurately placing and securing one or more foam layers onto an innercore unit and bucket assembly. FIG. 2 depicts an exemplary exploded perspective view of an innercore unit and bucket assembly with foam topper layers generally designated by reference numeral 20 employed in construction of the mattress. The bucket 22 generally includes a planar base layer 24 dimensioned to approximate the length and width dimensions of the intended mattress. The base layer 24 may consist of foam, fiber pad or it may comprise a wooden, cardboard, or plastic structure selected to provide support to the various components that define the mattress, e.g., innercore unit, side, end rails, and the like. Depending on the innercore unit selected and its inherent stiffness, stiffer or more compliant base layers may be chosen. By way of example, the base layer 24 may be formed of a high density polyurethane foam layer (20-170 pounds-force, also referred to as the indention load deflection (ILD)), or several foam layers (20-170 pounds-force ILD each), that alone or in combination, provide a density and rigidity suitable for the intended mattress manufacture. Other foams or fiber pads may be used. Such a choice is well within the skill of an ordinary practitioner.

An end and side rail assembly 26, which can be manufactured as a single piece or as multiple pieces, is affixed about the perimeter of the planar base layer 24 to define the bucket. The end and side rail assembly 26 is typically constructed from a dense natural and/or synthetic foam material of the type commonly used in the bedding arts. The foam may be (but is not limited to) latex, polyurethane, or other foam products commonly known and used in the bedding and seating arts and having a suitable density. A typical density is about, but not limited to 1.0 to 3.0 lb/ft$^3$ and more typically 1.5 to 1.9 lb/ft$^3$, and a hardness of 35 to 70 ILD, and more typically 40 to 65. One example of such a foam is the high density polyurethane foam and is commercially available from the Foamex Corporation in Linwood, Ill. Alternatively, any foam having a relatively high indention load deflection (ILD) would be satisfactory for the manufacture of the end and side rail assembly. Although a specific foam composition is described, those skilled in the art will realize that foam compositions other than one having this specific density and ILD can be used. For example, foams of various types, densities, and ILDs may be desirable in order to provide a range of comfort parameters to the buyer.

The size of the end and side rail assembly 26 can vary according to the mattress size and application, but each rail typically measures 3-10 inches (7.5-25 cm) in thickness. The depicted end and side rails are typically equal in width, and their length is chosen to correspond to the length of the size of mattress desired. For a regular king size or queen size mattress, the length of rails can be about 78.5 inches (200 cm), although the length can vary to accommodate the width of the header or footer, if the header or footer is to extend across the full width of the base platform 102. Similarly, the header/footer piece typically has a thickness of about 3-10 inches (7.7-25 cm), and the width is chosen to correspond to the width of the size of mattress desired. In the case of a regular king size mattress the width would be about 75.25 inches (191 cm), and for a queen size mattress, the width would be about 59.25 inches (151 cm), depending on how the foam rails are arranged to form the perimeter sidewall.

The end and side rail assembly 26 can be mounted or attached to base layer 24 by conventional means, such as (but not limited to) gluing, stapling, heat fusion or welding, or stitching.

The bucket 22 formed of the base layer 24 and end and side rail assembly 26 as constructed defines a well or cavity 28. The well or cavity 28 provides a space in which the innercore unit 30 can be inserted.

As noted above, the innercore unit 30 may be comprised of conventional helical or semi-helical coil springs and/or foam known and used in the art today. The coil springs may be open or encased in a fabric material, either individually in pockets, in groups, or in strings joined by fabric, all of which are well-known in the bedding art. For many years, one form of spring assembly construction has been known as Marshall Construction. In Marshall Construction, individual wire coils are each encapsulated in fabric pockets and attached together in strings which are arranged to form a closely packed array of coils in the general size of the mattress. Examples of such construction are disclosed in U.S. Pat. No. 685,160, U.S. Pat. No. 4,234,983, U.S. Pat. No. 4,234,984, U.S. Pat. No. 4,439,977, U.S. Pat. No. 4,451,946, U.S. Pat. No. 4,523,344, U.S. Pat. No. 4,578,834, U.S. Pat. No. 5,016,305 and U.S. Pat. No. 5,621,935, the disclosures of which are incorporated herein by reference in their entireties.

Alternatively, the innercore unit may be formed of foam or a combination of foam and coils springs. The foam, in some embodiments, can be a monolithic block of a single type of resilient foam selected from foams having a range of densities (themselves well-known in the art) or multiple foam layers for supporting one or more occupants during sleep. In one embodiment, foam within the innercore unit is made of any industry-standard natural and/or synthetic foams, such as (but not limited to) latex, polyurethane, or other foam products commonly known and used in the bedding and seating arts having a density of 1.5 to 1.9 lb/ft$^3$ and 20 to 35 pounds-force ILD. Although a specific foam composition is described, those skilled in the art will realize that foam compositions other than one having this specific density and ILD can be used. For example, foams of various types, densities, and ILDs may be desirable in order to provide a range of comfort parameters to the buyer.

In an alternative embodiment, the foam innercore unit may comprise one or more horizontal layers of multiple types of foams arranged in a sandwich arrangement. This sandwich of different foams, laminated together, may be substituted for a homogeneous foam block of a single density and/or ILD.

In a further embodiment, the foam core may comprise one or more vertical regions of different foam compositions (including vertical regions having multiple horizontal layers), where the different foams are arranged to provide different amounts of support (also referred to as "firmness" in the art) in different regions of the sleeping surface.

Accordingly, the present disclosure is not limited to any particular type of foam density or ILD or even to a homogenous density/ILD throughout the foam core.

Still further, the innercore unit may comprise one or more air bladders by themselves or in combination with coil springs, foam, or combinations thereof.

The innercore unit and bucket assembly are then overlayed with one or more foam topper layers 32 on the top surfaces, and the whole assembly is encased within a ticking, often quilted, that is sewn closed around its periphery to a border or boxing. After assembly, the mattress can be covered by any other decorative covering or pillow-top. In the present disclosure, the apparatus and process are directed to precision placement and securement of the one or more foam top layers 32 to the top surface of the innercore unit and bucket assembly.

The resulting mattress is not intended to be limited and may be of any type, dimension, and/or shape. For example, the mattress may be a foam mattress, a coiled mattress, a foam and coil mattress, an air mattress, combinations thereof, or the like. Typically, the mattress is square or rectangular-shaped and has a thickness ranging from about 4 inches to about 20 inches. The length and width can vary depending on the intended application and typically has a width of about 2 feet to about 7 feet and a length of about 4 feet to about 10 feet, although custom sizes may require smaller or larger dimensions.

Figure 3:
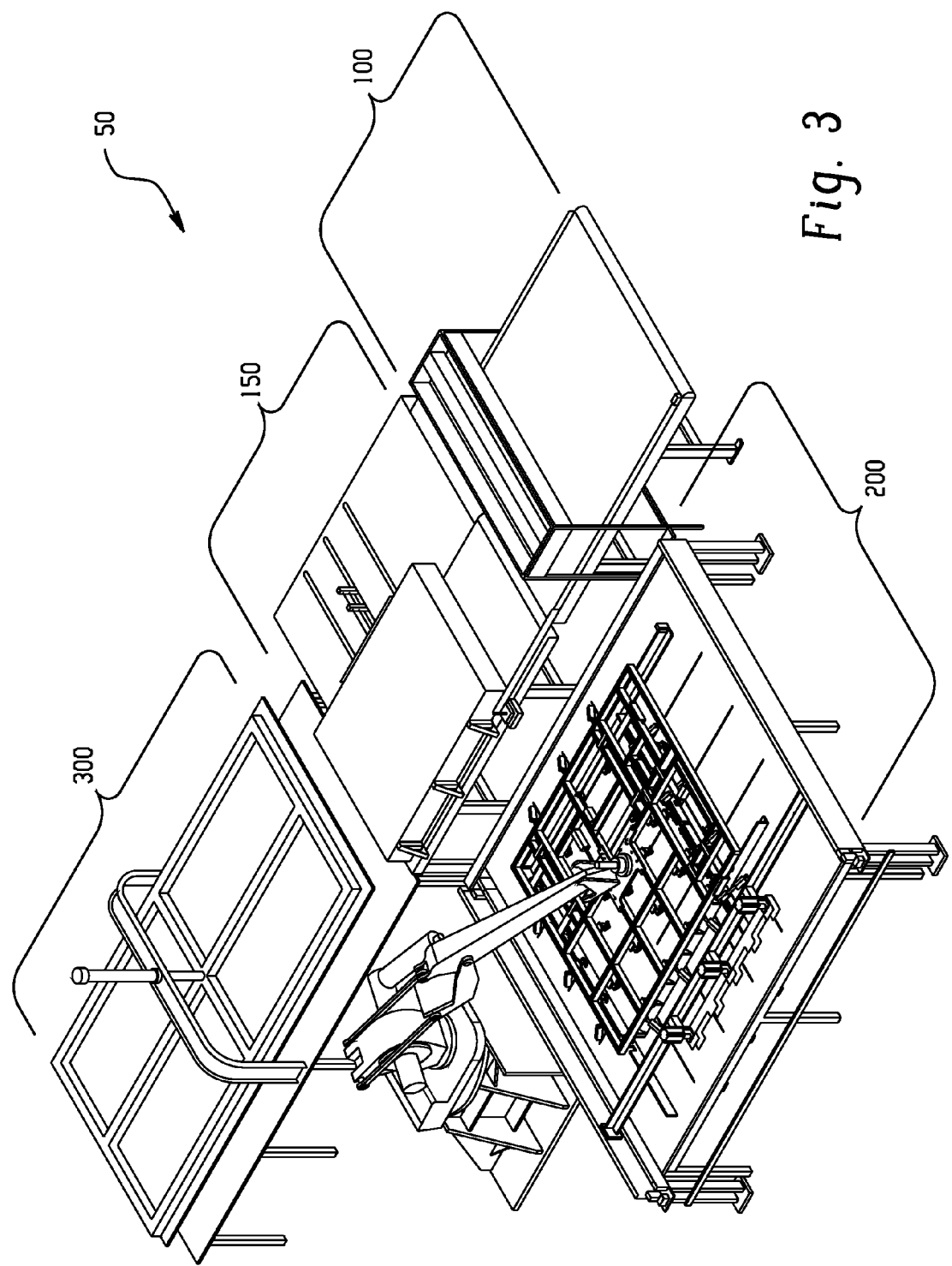
FIG. 3 depicts a perspective view of an apparatus for accurately securing one or more foam topper layers onto an innercore unit and bucket assembly in accordance with an embodiment of the present disclosure.

Turning now to FIG. 3, the apparatus, generally designated by reference numeral 50, includes an adhesive applicator station 100 for automatically applying controlled amounts of adhesive in a desired pattern onto a top surface of an innercore unit and bucket assembly (or in the case where one foam layer has already been placed and adhesively secured, onto the top surface of the foam layer); an innercore unit and bucket assembly alignment station 150 for automatically aligning and accurately defining a position thereof; automated delivery/transfer of a foam layer from an automated guide vehicle to the sizing table (not shown), a foam layer sizing and robotic transfer station 200 for automatically delivering, locating, sizing, picking, and placing one or more foam layers onto the innercore unit and bucket assembly; and a compression station 300 for compressing the foam layer(s) onto the innercore unit and bucket assembly to provide consistent adhesion of the foam layer to the underlying top surface of the innercore unit and bucket assembly.

As shown, the adhesive applicator station 100, innercore unit and bucket assembly alignment station 150, and the compression station 300 are serially aligned with one another as shown, wherein each station includes a movable surface (e.g., a conveyor rotatably driven by a motor) to define a travel path of the innercore unit and bucket assembly during alignment and as the foam layer(s) is placed thereon. However, it should be apparent that the apparatus 50 is not intended to be limited to the particular configuration as shown. Other variations and configurations will be apparent to those skilled in the art in view of this disclosure.

The movable surfaces of the stations, 100, 150, and 300 are generally coplanar to each other to permit transfer into and out of the respective stations as will be described in greater detail below. The tables supporting the various movable surfaces may also be interconnected to provide greater stability or may be fixedly attached to the ground. The foam layer sizing and robotic transfer station 200 is adjacent to the serially aligned adhesive applicator station 100, innercore unit and bucket assembly alignment station 150, and the compression station 300. In the embodiment as shown, the foam layer sizing and robotic transfer station 200 is immediately adjacent to the innercore unit and bucket assembly alignment station 150 to minimize the travel of the robot to effect placement of the foam layer from the sizing table onto the innercore unit and bucket assembly within the innercore unit and bucket assembly alignment station 150.

The apparatus and process is operably linked to a programmable logic control system (PLC system) or serial bus system and/or manufacturing execution solution (MES system) to plan and schedule the different process steps as well as minimize and/or eliminate manual labor, which represents a significant departure from prior art assembly processes. Each station is configured to communicate with the MES system, which are commercially available from a variety of suppliers, e.g., Preactor from Siemens AG. Designing the appropriate algorithms to perform the various steps to plan, schedule, operate, and control the system is well within the skill of those in the art. The data and inputs for operating the systems are generally available to an operator via a computer interactive display. The various actuators controlled by the system employed to automate the process are not intended to be limited to any particular type, e.g., pneumatic, hydraulic, electrical, and the like. Suitable actuators include servomotors, stepper motors, pneumatic actuators, hydraulic actuators, and the like.

Adhesive Applicator Station

Figure 4:
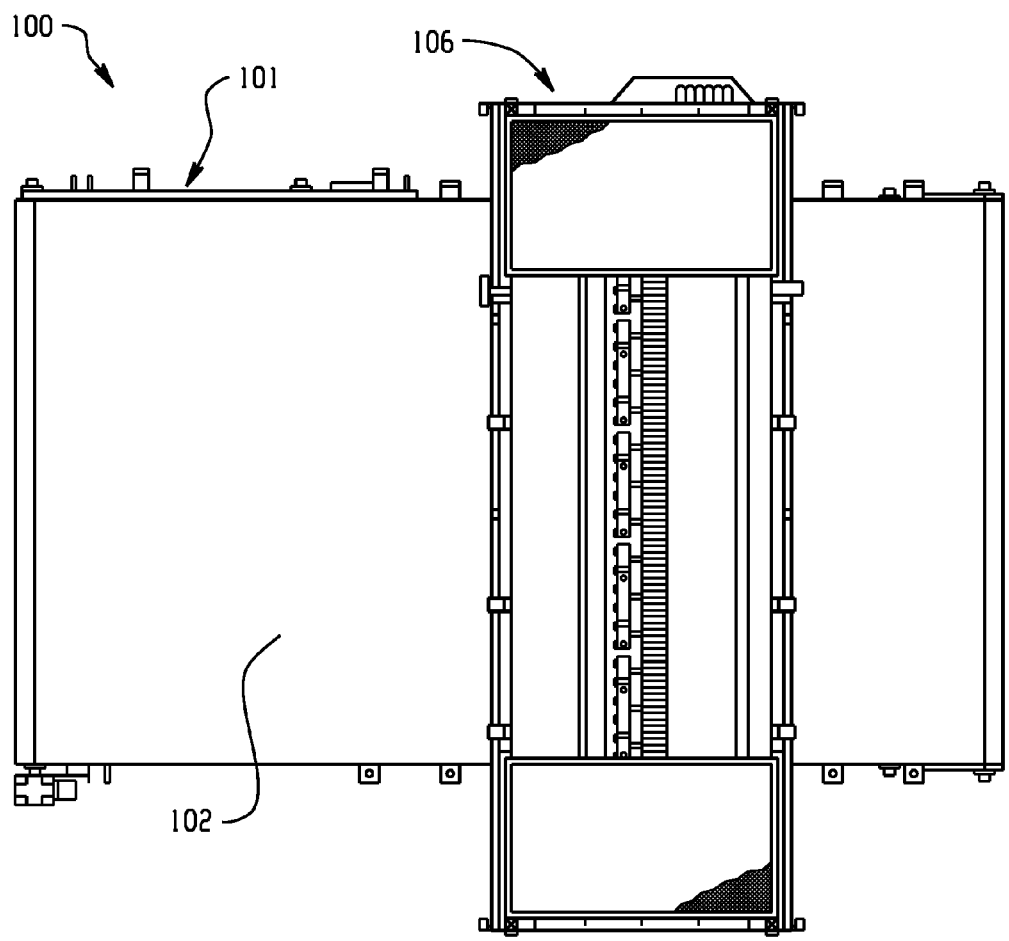
FIG. 4 depicts a perspective top down view of an adhesive applicator station utilized in the apparatus of FIG. 3.

Referring now to FIG. 4, there is shown a top down view of the adhesive applicator station 100, which includes a table 101 having a generally planar support surface 102 configured to support the innercore unit and bucket assembly during the process of applying adhesive to the innercore unit and bucket assembly. The support surface 102 can be elevated relative to ground and may include a movable support surface (i.e., a conveyor) for transferring the innercore unit and bucket assembly into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station. Adjustment to the speed of the movable support surface allows for tailored feed rates to pair the adhesive application with placement of the foam layer or the like, thereby providing reproducible adhesive volume application in a desired pattern.

Figure 5:
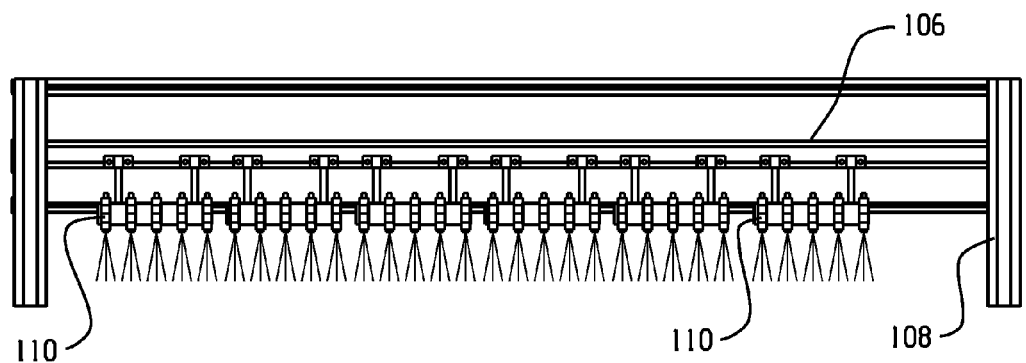
FIG. 5 depicts a side view of an exemplary glue bridge for the adhesive applicator station of FIG. 4.

As shown more clearly in FIG. 5, the adhesive applicator station 100 further includes a bridge 106 carried by supports 108, wherein the bridge laterally spans across the length or width dimension of the support surface 102. Optionally, the bridge may be mounted directly to the underlying support surface 102. As shown, the bridge 106 generally spans a width dimension of the support surface, which during operation extends beyond a width dimension of the innercore unit and bucket assembly. The bridge is elevated relative to the support surface and positioned proximate to the innercore unit and bucket assembly alignment station 150, wherein the bridge is at a height from the support surface effective to permit clearance of the innercore unit and bucket assembly, with or without additional foam layers disposed thereon. In some embodiments, the bridge may be vertically movable, which is desired for the glue application to achieve consistent glue spray patterns. The bridge has coupled thereto one or more adhesive applicators 110, which may be statically or dynamically mounted to the bridge. The adhesive applicators are oriented to apply a desired pattern of adhesive to a top surface of an underlying innercore unit and bucket assembly (or foam layer if one is already placed and secured thereto). In this manner, adhesive may be applied to the top surface as the innercore unit and bucket assembly (or foam layer) as the assembly is conveyed into and from the adhesive applicator station.

The adhesive applicator(s) is configured to provide a controlled amount of adhesive in a desired pattern to the top surfaces innercore unit and bucket assembly (or foam layer). In some embodiments, the adhesive applicator(s) may be moveable across the bridge so that application of the adhesive can be optimally located for each size and/or type of innercore unit and bucket assembly and/or foam layer as well as providing a desired pattern of the adhesive.

In the foregoing embodiments, the application of the adhesive may be intermittent or continuous. Similarly, the adhesive may be applied to the entire top surface or to selected portions thereof as may be desired in some applications. In one embodiment, the adhesive applicator includes a plurality of nozzles in fluid communication with a source of adhesive such as a hot melt adhesive. The adhesive applicator may be coupled to a motion detector system or sensor system (not shown) for actuating the nozzles as the innercore unit and bucket assembly is transferred into and/or out of the adhesive application station 100. Adhesive application can be triggered by the product presence sensors in conjunction with PLC logic code to ensure exact start and stop of adhesive application for the particular mattress size. The PLC/MES system may be programed to adjust the adhesive application based on the type of foam topper (density and ILD) and foam layer sequence (e.g., third foam layer on the inner core unit and bucket assembly which is close to the mattress surface assumes incremental movement and can require a different glue pattern compare to other stackedly arranged foam layers, e.g., additional foam layers and/or the first foam layer disposed on the innercore unit and bucket assembly). In one embodiment, the adhesive applicator 110 is a dual pump spray system that provides a metered volume and the nozzles therein are configured to provide a desired pattern of an adhesive through the use of the programmable logic control device and/or glue spray pattern code/logic. For example, actuation of the adhesive applicator can be configured to occur upon detection by the motion detector system of the leading edge of the innercore unit and bucket assembly traveling underneath the adhesive applicator and discontinued upon detection of the trailing edge of the bucket. The automation provided by the adhesive applicator(s) provides controlled adhesive application and patterning, thereby allowing for significantly more consistent and repeatable application of the adhesive as compared to prior art processes. Moreover, by providing a specific pattern and volume of adhesive, significant cost savings can be realized relative to the prior art manual spray application of the adhesive by an operator.

Innercore Unit and Bucket Assembly Alignment Station

Figure 6:
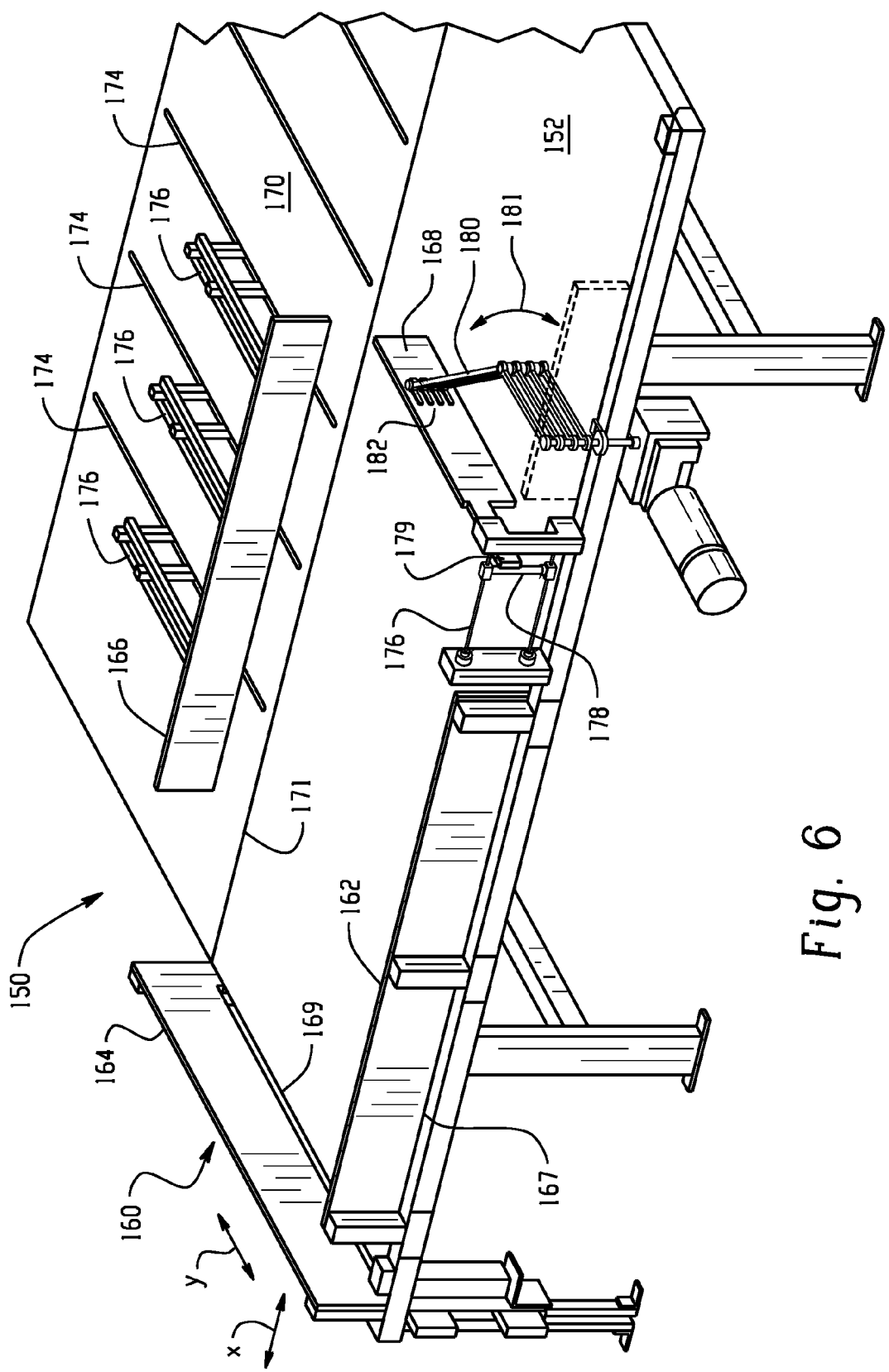
FIG. 6 depicts partial perspective views of an innercore unit and bucket assembly alignment station utilized in the apparatus of FIG. 3.
Figure 7:
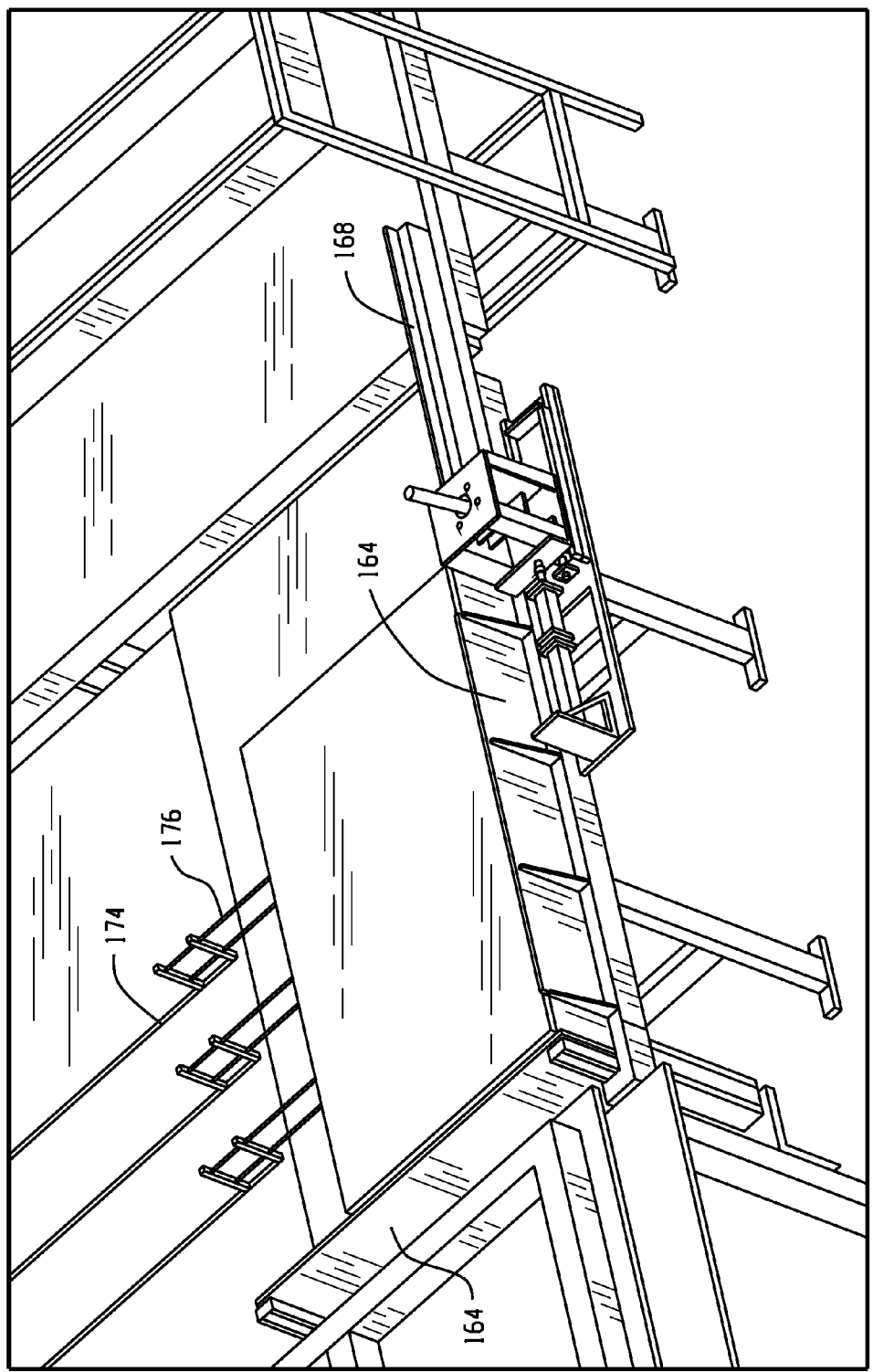
FIG. 7 also depicts partial perspective views of an innercore unit and bucket assembly alignment station utilized in the apparatus of FIG. 3.

The innercore unit and bucket assembly alignment station 150 shown in FIGS. 6-7 includes a support surface 152 for supporting the innercore unit and bucket assembly during alignment as well as during foam layer placement. The support surface 152 may include a movable support surface for transferring the innercore unit and bucket assembly into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station.

The alignment station 150 further includes an adjustable rail assembly 160 for aligning the innercore unit and bucket assembly to a precise reproducible location. The rail assembly generally includes two reference rails 162, 164 that collectively define a base datum corner of the innercore unit and bucket assembly when seated against these rails. Reference rail 162 extends along a side of the support surface 152 (i.e., the x-direction and is generally parallel to the travel path of the innercore unit and bucket assembly) and reference rail 164 is transverse to the support surface 152 and is positioned at the edge of the support surface 152 (i.e., the y-direction and is generally perpendicular to the travel path of the innercore and bucket assembly). Reference rail 162 may be fixedly mounted to the side 167 of the support surface 152. Reference rail 164 is disposed at support surface end 169 generally perpendicular to the travel path of the innercore unit and bucket assembly. Both rails 162, 164 may be vertically retractable with respect to ground via an actuator controlled by the PLC system. During the alignment process, reference rail 164 is in the raised position as shown and during transfer from one station to another, the rail may be retracted so as to permit the innercore unit and bucket assembly to travel unimpeded along the travel path.

The adjustable rail assembly further includes movable rails 166 and 168, wherein the rails 162, 164, 166, and 168, collectively frame the innercore unit and bucket assembly during the alignment process with movable rails 166 and 168 pushing the innercore unit and bucket assembly against the reference rails, thereby establishing a base datum reference indicative of the exact position and orientation of the innercore unit and bucket assembly. Movable rail 166 is positioned parallel to the travel path of the innercore unit and bucket assembly and is configured to move in the y-direction so as to compress against a sidewall of the innercore unit and bucket assembly when in use and movable rail 168 is configured to push against a sidewall of the innercore unit and bucket assembly in the x-direction. Each of the rails 162, 164, 166, and 168 includes a planar surface perpendicular to the support surface. In this manner, during alignment the movable rails 166, 168 serve to push the innercore unit and bucket assembly against reference rails 162, 164 such that a corner of the innercore unit and bucket assembly is seated against reference rails 162, 164 at a precise, reproducible location and orientation.

Movable rail 166 is movably disposed on a support surface 170 that is adjacent and coplanar to end 171 of the support surface 152. Support surface 170 includes one or more track guides 174 that are generally perpendicular to the travel path of the innercore unit and bucket assembly. An arm 176 is attached at one end to a back side of the rail 166 and at the other end movably coupled to the track guide. The particular numbers of arms attached to the rail 166, three of which are shown, are not intended to be limited. At least one arm is operably linked to rail 166. Likewise, the number of track guides is not intended to be limited and will generally correspond to the number of arms. An actuator controlled by the PLC system is operably linked to the arm to selectively move rail 166 along the track guide 174.

Movable rail 168 is attached to a hinge 178 at one end 179 and to a retractable arm 180 at about the other end 182. The retractable arm 180 provides rotation about an axis of the hinge 178 such that when in use the rail 168 is positioned to be parallel to a sidewall of the innercore unit and bucket assembly and when not in use the rail is retracted away from the sidewall. As shown, retraction of the arm 180 in the direction shown by arrow 182 swings the rail 168 out of the travel path of the innercore unit and bucket assembly. The hinge 178 (and rail 168) is movably coupled to guide rails 176 to effect linear movement of the rail along the travel path if the innercore unit and bucket assembly. When the arm is extended, travel of the rail 168 along the guide rails 176 permits the rail 168 to push against a sidewall of the innercore unit and bucket assembly. Optionally, the movable rail may further include a stop (not shown) for receiving the rail when retracted. The stop may be magnetic and may include a recess for receiving the rail. One or more actuators, e.g., servomotors, two of which are shown, are operably linked to the rail 168 to provide extension and retraction of rail as well as to movement of the rail along the guide rails.

Foam Layer Sizing and Robotic Transfer Station

Figure 8:
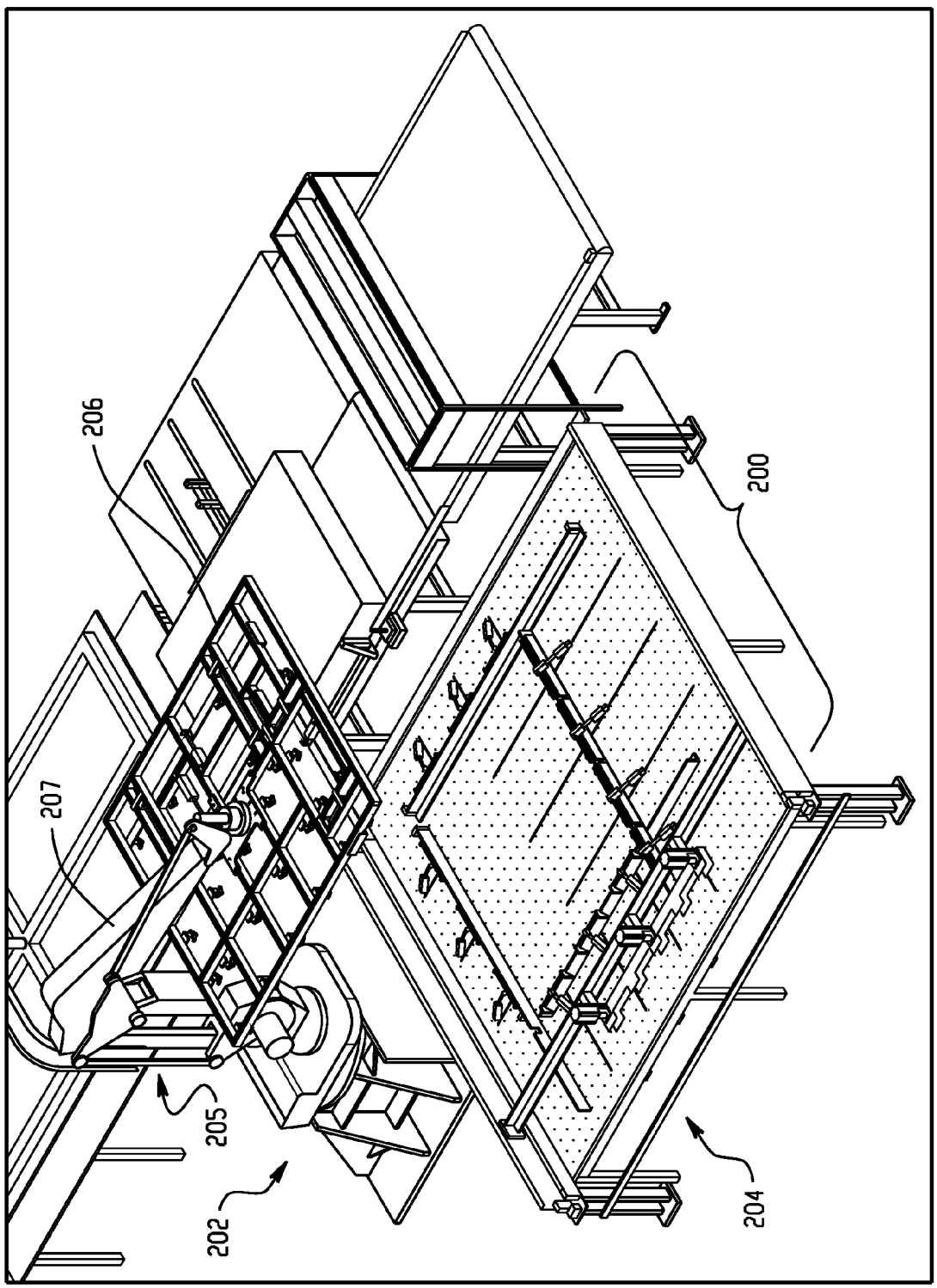
FIG. 8 depicts a perspective view of a foam layer sizing and robotic transfer station utilized in the apparatus of FIG. 3.

Turning now to FIG. 8, there is shown the foam layer sizing and robotic transfer station 200, which generally includes a robotic lifting assembly 202 and a foam layer sizing table 204. The robotic lifting assembly 202 moves in response to command signals to lift a nominally sized foam layer from the sizing table 204 and precisely place the foam layer onto the innercore unit and bucket assembly. The robotic lifting assembly 202 generally includes a multi-axis functional robot 205 and a lifting assembly 206 attached to an arm 207 of the multi-axis functional robot. The robot itself is not intended to be limited and is commercially available from numerous sources. An exemplary industrial robot for picking and placing the foam layer is commercially available from ABB Ltd.

Figure 9:
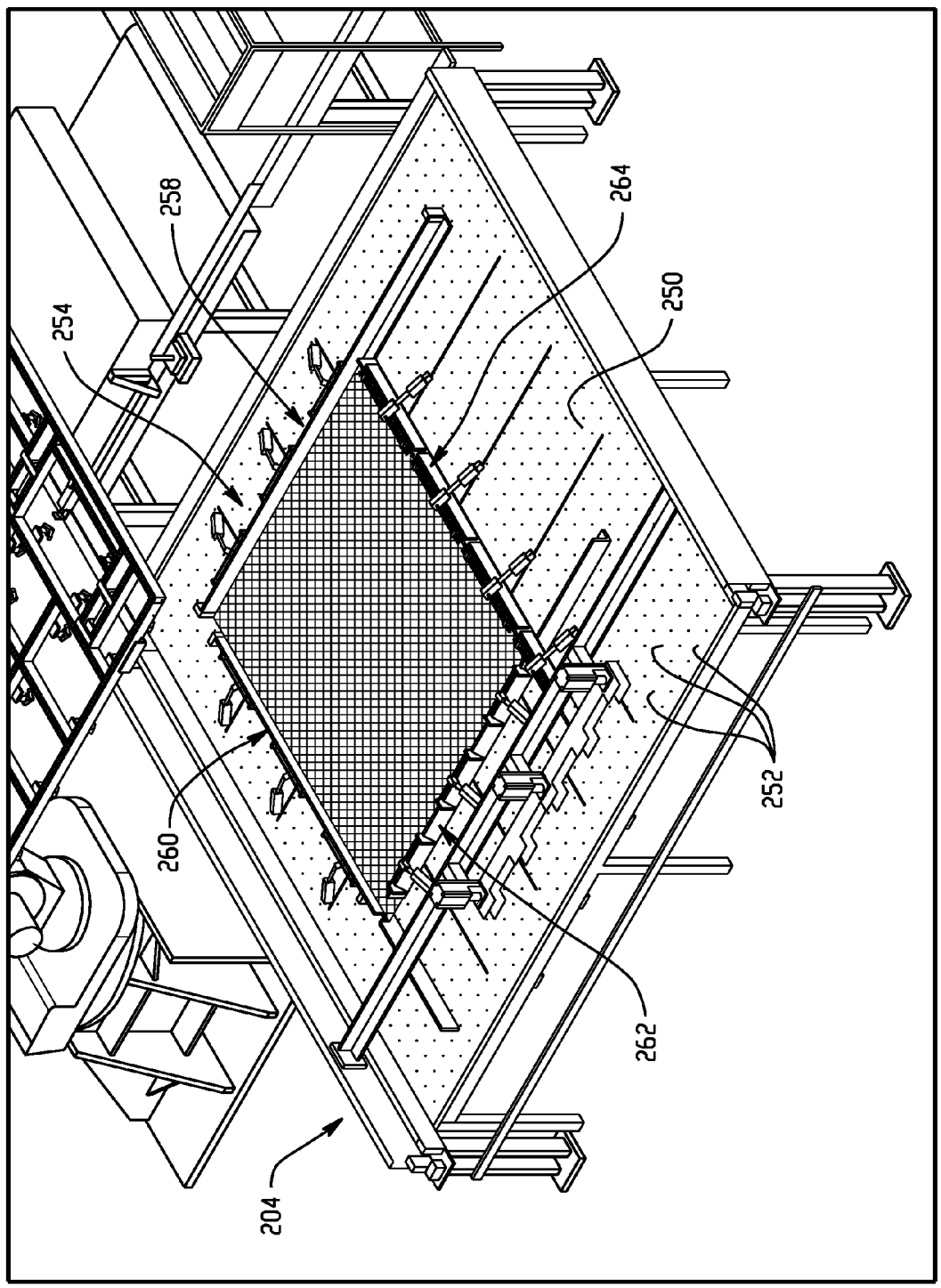
FIG. 9 depicts a perspective view of an exemplary sizing table utilized in the foam layer sizing and robotic transfer station of FIG. 8.
Figure 10:
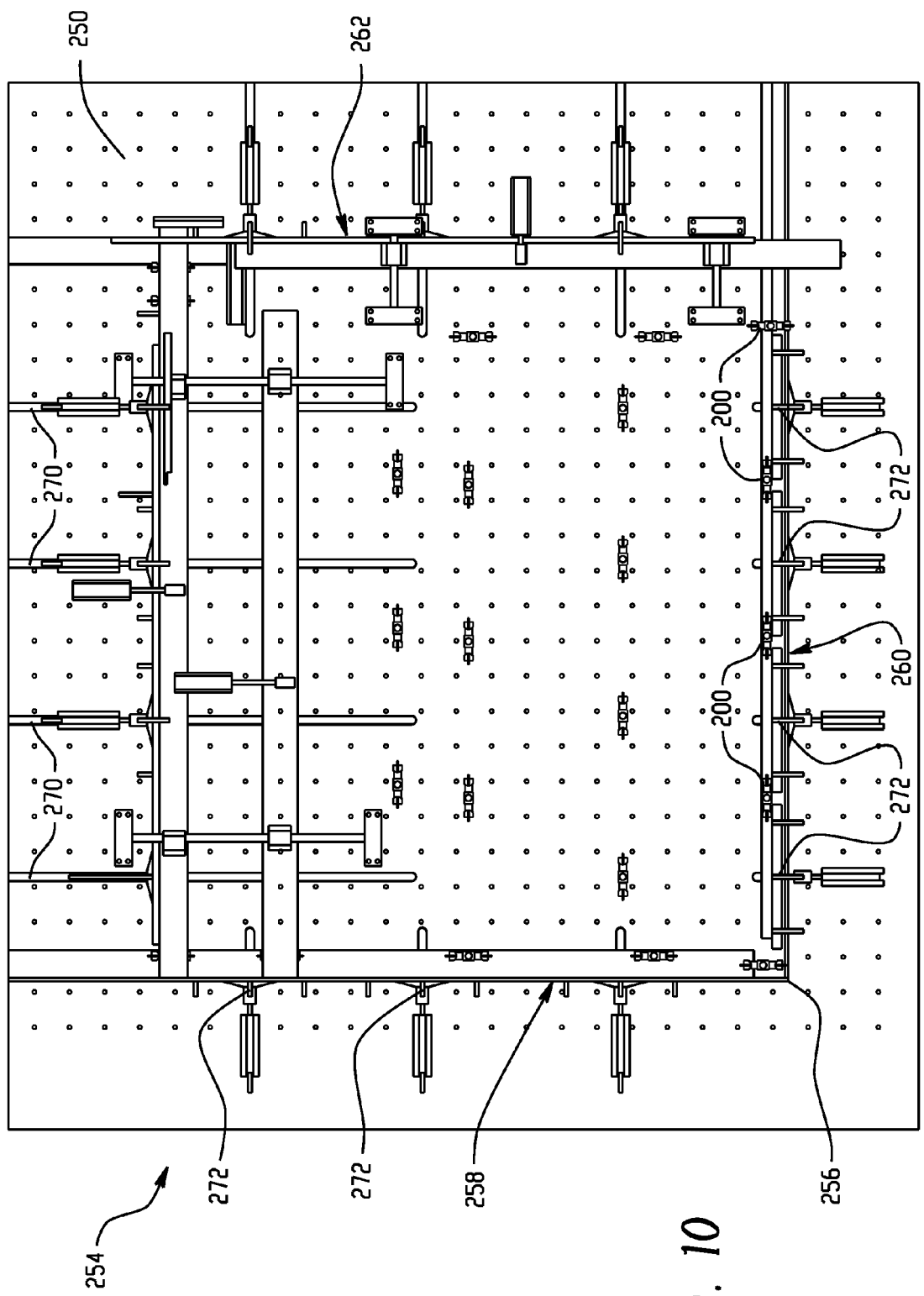
FIG. 10 provides a top down view of the exemplary sizing table with positioning of the lifting units utilized in the foam layer sizing and robotic transfer station of FIG. 8.

As shown in FIGS. 9-10, the sizing table 204 includes a generally planar surface 250 for supporting the foam layer during the sizing process. The planar surface 250 may include a plurality of perforations 252 extending through the surface. The sizing table 204 further includes an adjustable rail assembly 254 shown more clearly in FIG. 10 for sizing the foam layer to a nominal size and providing a precise reproducible location to the apparatus. As used herein, the term nominal size is to be accorded its usual and customary meaning. In general, nominal size refers to a standardized dimension specific to the intended mattress dimension, e.g., twin, queen and the like. The nominally sized foam layer will generally be sized to match the length and width dimensions of the innercore unit and bucket assembly (or foam layer disposed thereon) to which the nominally sized foam layer is to be attached. The adjustable rail assembly 254 is configured to frame the foam layer as shown in FIG. 9 and automatically compress the foam layer to less than nominal size followed by stretching of the foam layer to the nominal size defined by the programmed specification for the particular foam layer, which is then lifted and subsequently placed on the innercore unit and bucket assembly via the robotic lifting assembly 202. As will be discussed in greater detail below, the adjustable rail assembly 254 provides a base datum corner 256 for the foam layer, which is then matched with the base datum corner of the aligned innercore unit and bucket assembly to provide precise placement and orientation of the foam layer onto the innercore unit and bucket assembly.

The adjustable rail assembly 254 generally includes two reference rails 258, 260 adjustably positioned on the sizing table 204 that generally intersect at one end at a right angle on the table at a known location so as to collectively define the base datum corner 256 for the foam layer when seated against these rails. Reference rail generally 258 generally corresponds to a width dimension of the foam layer and reference rail 260 generally corresponds to a length dimension of the foam layer.

The adjustable rail assembly further includes movable rails 262 and 264, wherein the rails 258, 260, 262, and 264 collectively frame the foam layer during the sizing process with the movable rails 262 and 264 aligning the foam layer, which is then compressed by the rails 258, 260, 262, and 264. The rails may be of unitary construction or may comprise segments of equal or differing lengths, wherein each segment may be independently controlled by an actuator, e.g., a pneumatic actuator.

Movable rail 262 is positioned parallel to reference rail 258 and movable rail 264 is positioned parallel to reference rail 260 so as to define the adjustable rail assembly 254. Each of the rails 258, 260, 262, and 264 includes a planar surface perpendicular to surface 250. In this manner, during sizing the rails 258, 260, 262, 264 serve to compress the foam layer against the respective opposing rail.

The surface 250 further includes one or more track guides 270 that are generally perpendicular to rails 258, 260, 262, and 264. The rails are operably coupled to the track guides 270 via an arm 272 attached at one end to a back side of the rails and at the other end movably coupled to the track guide. The particular numbers of arms attached to the rails are not intended to be limited. At least one arm is operably linked to the rail. Likewise, the number of track guides is not intended to be limited and will generally correspond to the number of arms. An actuator such as a servomotor controlled by the PLC system is operably linked to the arms to selectively and precisely move the rails along the corresponding track guide 270. Movable rails 262 and 264 include longer track guides to accommodate different size foam layers whereas rails 258 and 260 include shorter track guides to provide compression of the foam layer during the sizing process.

Each of the rails 258, 260, 262, and 264 further includes a gripper assembly for clamping onto the foam layer during the stretching step of the sizing process. As noted above, the foam layer is first compressed against the rails to less than nominal size. During the stretching step, the gripper assemblies disposed on the rails 258, 260, 262, 264 are actuated to clamp downward onto the foam layer and rails 262, 264 are then moved to a predefined position. The movement of rails 262, 264 to the predefined position stretches the foam layer to its nominal size as defined by the foam layer specification. The gripper assemblies 280 are generally pivotably coupled to and spaced about the rails to provide controlled gripping of the foam at the edge and stretching.

Figure 11:
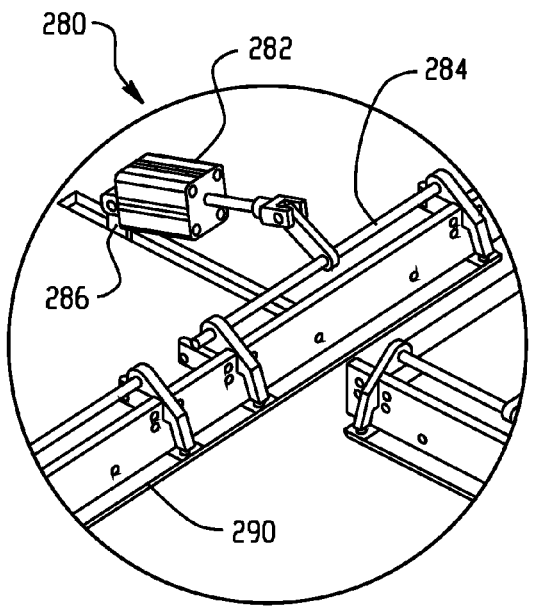
FIG. 11 illustrates front and rear facing perspective views of a gripper assembly for use in compressing and stretching a foam layer in the foam layer sizing and robotic transfer station in accordance with an embodiment of the present disclosure.
Figure 12:
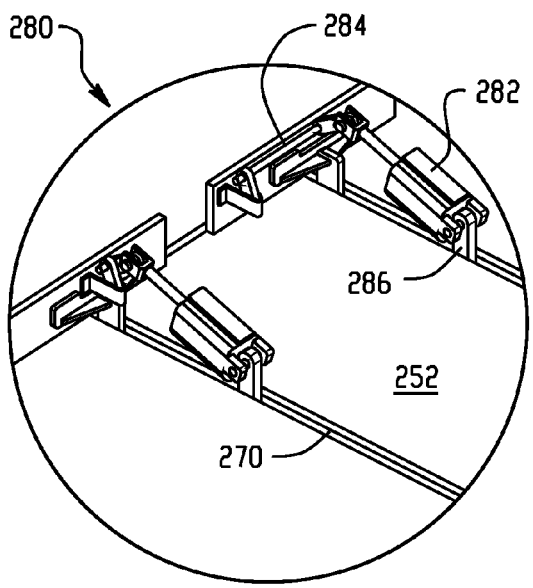
FIG. 12 also illustrates front and rear facing perspective views of a gripper assembly for use in compressing and stretching a foam layer in the foam layer sizing and robotic transfer station in accordance with an embodiment of the present disclosure.
Figure 13:
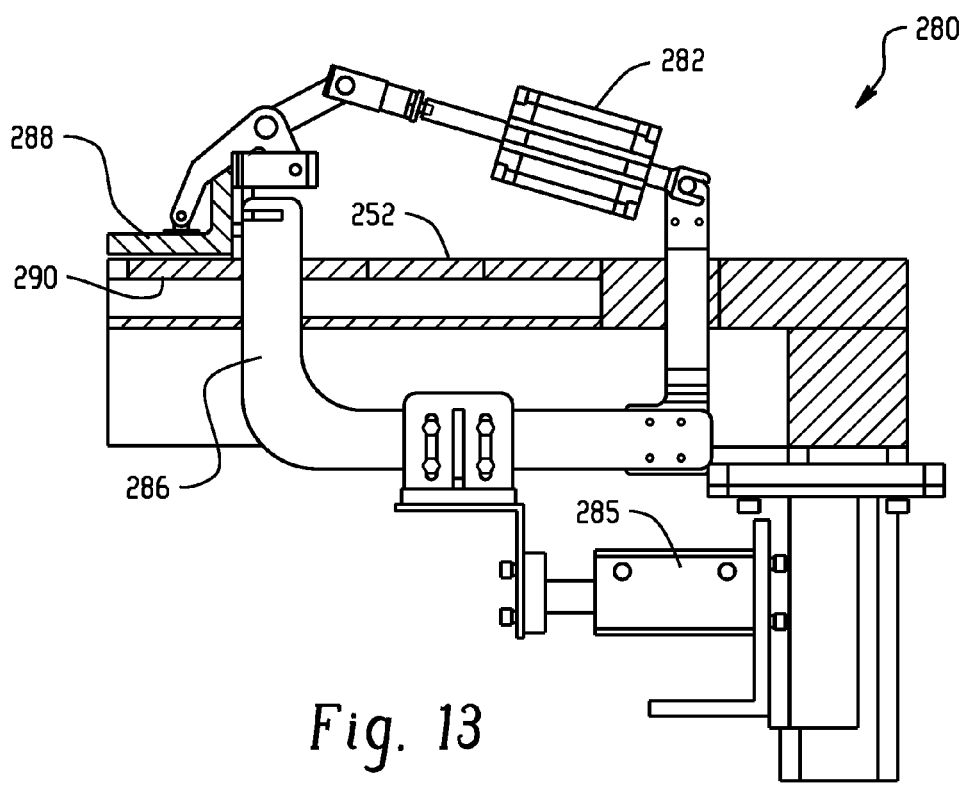
FIG. 13 illustrates a sectional view of the gripper assembly of FIGS. 11-12.

The particular gripper assemblies 280 are not intended to be limited. An exemplary gripper assembly is shown in FIGS. 11-13, wherein the gripper assembly 280 generally includes an actuator 282, e.g., a linear actuator or the like, that is coupled at one end to bar 284 and at the other end to a second actuator 285 disposed underneath the table 204 via a link 286 engaged within track guide 270. Actuation of the second actuator effects precision movement of the rail e.g., rail 258, across the surface 252 of the sizing table 204. The bar 284 is pivotably coupled to the rail and attached to a pivotably movable upper plate 288. The rail further includes a lower plate 290 upon which an outer periphery of the foam layer is generally disposed on after the foam layer is placed on the sizing table and compressed. Actuation of the actuator 284 pivotably lowers the movable upper plate 288 so as to sandwich the outer periphery of the foam layer between the movable upper plate 288 and the lower plate 290. Subsequent movement of the second actuator outwardly from the foam layer causes the rails to stretch the foam layer. Movement across the table is carefully controlled so that the foam layer is stretched to its nominal size.

Figure 14:
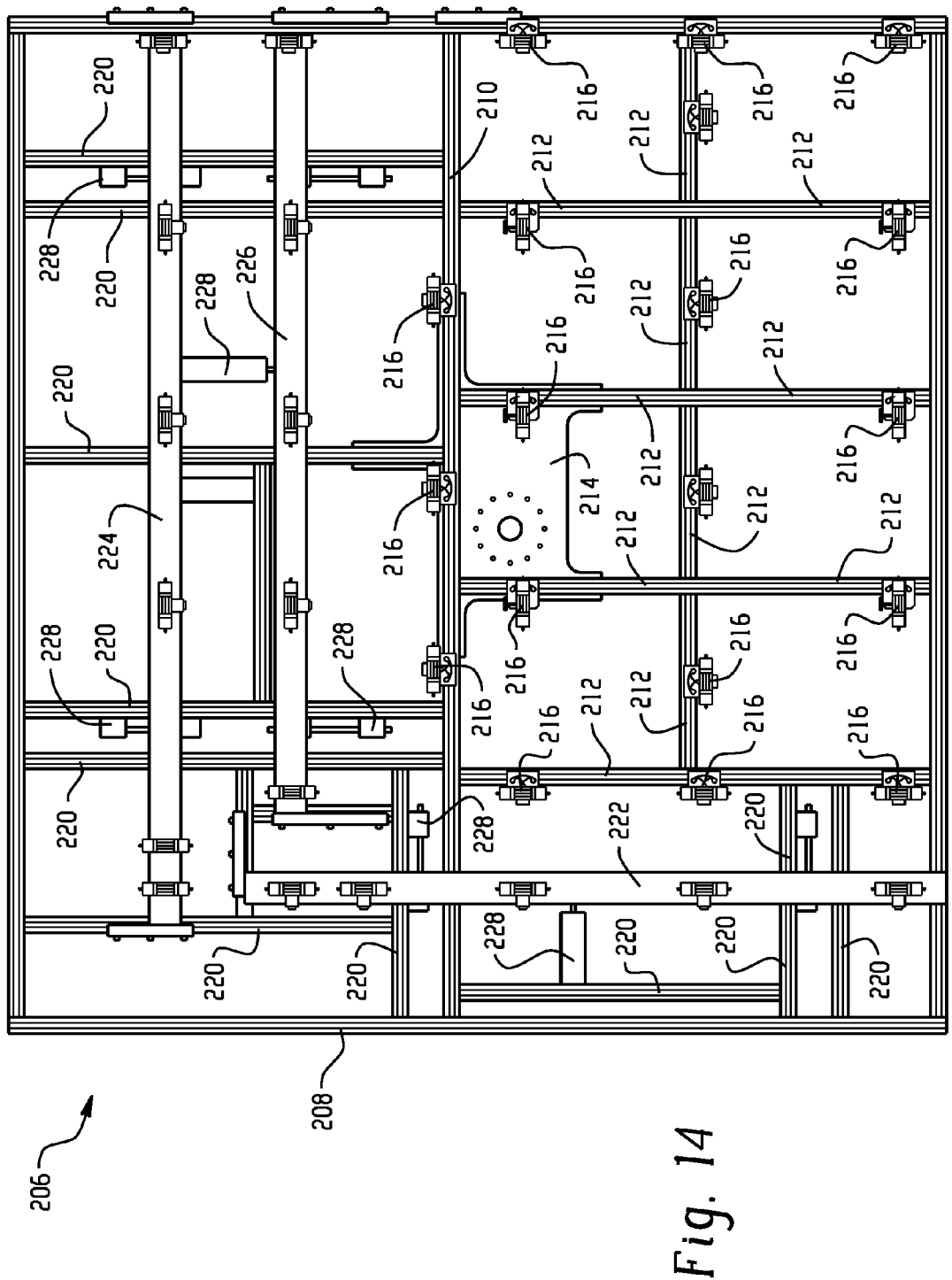
FIG. 14 provides a top down view of the lifting assembly for use in the foam layer sizing and robotic transfer station in accordance with an embodiment of the present disclosure.

In one embodiment, sensors may be located on the rails to assist in aligning the gripper assemblies to the edges of the foam layer. Servomotors may be employed to move the rails to the programmed position, e.g., moves the rails including the gripper assemblies to contact foam layer As shown more clearly in FIG. 14, the lifting assembly 206 includes a frame 208 with a primary beam 210 bisecting the frame 208 at about a midpoint. Secondary beams 212 are coupled to the beam 210 and/or the frame 206 to define a rectangularly shaped portion of the lifting assembly having attached thereto statically positioned lifting units 216 in a spaced arrangement about the rectangularly shaped portion, wherein the rectangularly shaped portion overlays a major portion of an underlying foam layer. The lifting assembly 206 further includes support beams 220 for supporting movable beams 222, 224, and 226 mounted thereto. Each movable beam 222, 224, and 226 includes additional lifting units 216 spacedly arranged on the beams. In some embodiments, the position of the lifting units 216 may be adjustable on the rail. The position of these movable beams 222, 224, and 226 can be selected and optimized based on the dimensions of the foam layer to be lifted corresponding to the mattress size. For example, movable beam 222 can be selectively moved to accommodate the manufacture of mattresses having various lengths e.g., standard, long, extra-long, etc. whereas movable beams 224 and 226 can be selectively moved to accommodate the manufacture of mattresses having various widths, e.g., twin, full, queen, king, etc. The movable beams are generally positioned to overlay an edge of the underlying foam layer that is outside the area overlayed by the statically positioned rectangular shaped portion discussed above. The position of the movable beams can be programmed in the PLC system. Precise movement of the rails can be provided by precision ball bearing slides or the like. An attachment plate 214 is centrally located on the frame and provides the means for attaching the arm to the lifting assembly.

Figure 15:
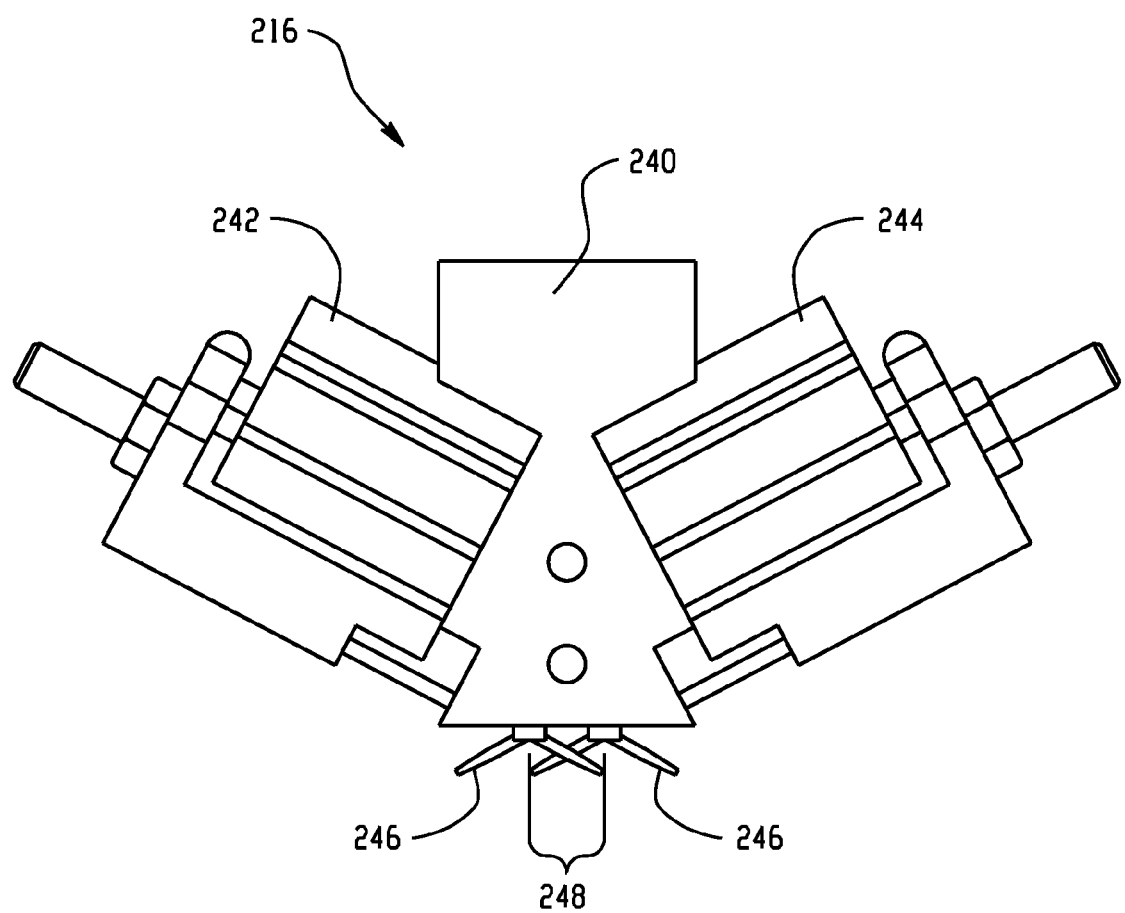
FIG. 15 depicts an exemplary lifting unit for use in the lifting assembly in accordance with the present disclosure.

As shown more clearly in FIG. 15, each one of the lifting units 216 generally includes a head 240 that supports two slides 242, 244, each of which is provided with one or more retractable angled needles 246 (shown extended from the head). The needles on one slide face towards the needles of the other slide, sloping one towards the others. The needles are at an angle relative to a foam layer of about 30 (150) to about 60 (120) degrees in most embodiments, although angles greater or less than this range can be used. In one embodiment, the needles are at an angle of 45 (135) degrees. Moreover, the needles from the respective slides are spaced by a gap 248 such that the needles from the opposing slides overlap when extended into the foam layer.

Both of the slides, and with them the needles that are fixed to them, are controlled and movable in opposite directions between an idle position, in which the needles on one slide are retracted and are at a distance from those on the other slide, and an active position, in which the needles of the two slides move forward, cross each other and sloping penetrate into the element to be picked up and, with the help of a flat head, they are able to gather it and transfer it according to requirements. An exemplary needle gripper is commercially available from Schmalz Inc. Exemplary needle grippers are disclosed in U.S. Pat. No. 8,104,807, incorporated herein by reference in its entirety and are commercially available from Schmalz, Inc.

Figure 16:
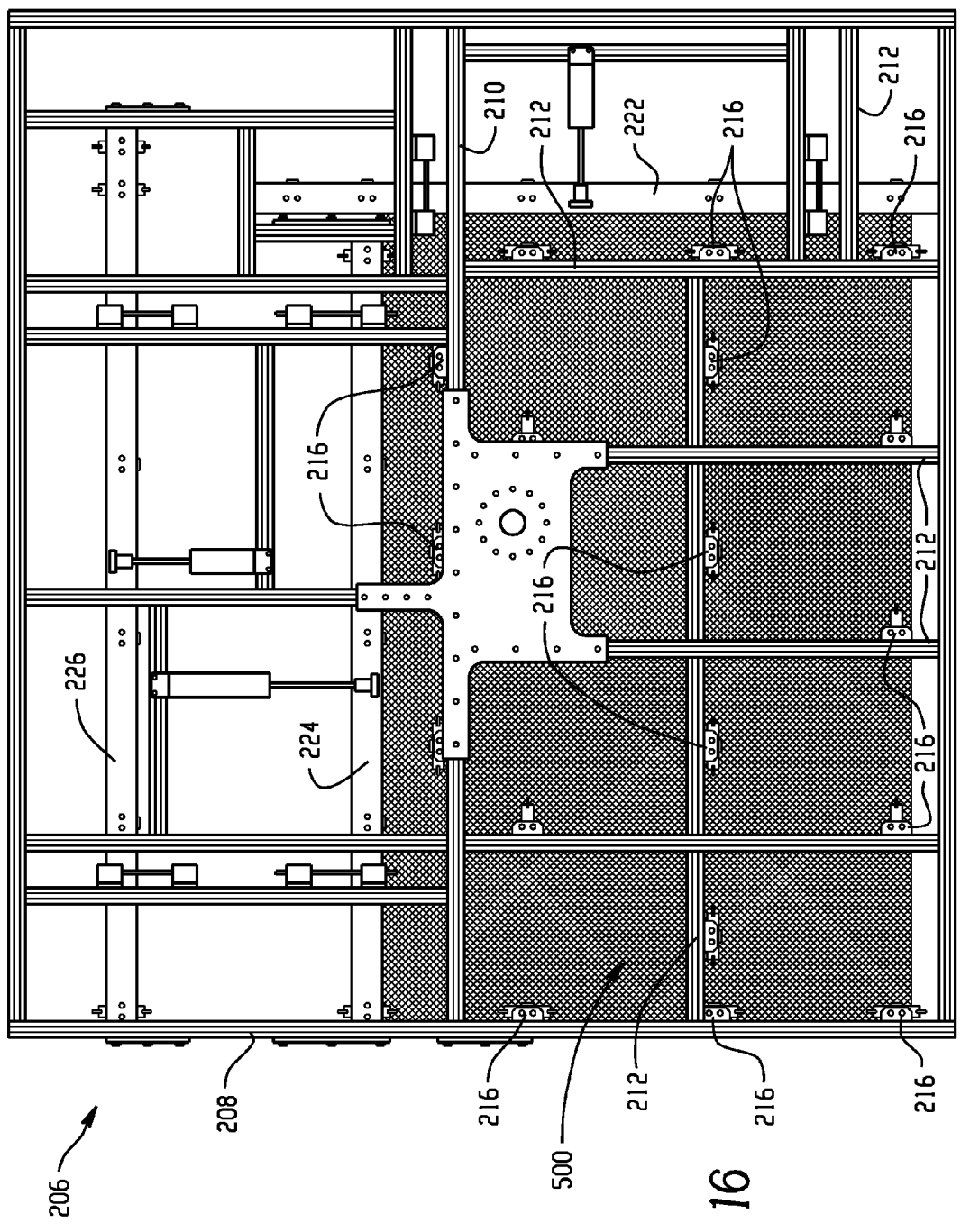
FIG. 16 depicts the lifting assembly positioned to lift a foam layer from the sizing table of FIG. 9.

FIG. 16 depicts the lifting assembly 206 positioned to lift an exemplary underlying foam layer 500 that has previously been compressed and stretched to a nominal size. The movable beams 222 and 224 are optimally positioned such that lift units 216 are at positions disposed over a peripheral edge of the foam layer as well as spacedly and uniformly arranged over an interior region of the foam layer so as to lift the foam layer and maintain its nominal size. In the embodiment shown, movable beam 226 is not needed to lift this particular sized foam layer and is positioned such that the lifting units disposed thereon do not overlay the foam layer.

During operation, the sizing table 204 (FIG. 9) first receives a foam layer from a delivery system, e.g., manually placed by an operator or through an automated guide vehicle or robotic assist via grippers, or the like. The movable rail sections on the sizing table 204 are activated to match the size of the foam layer being sized. The actuators, e.g., servomotors, are configured and programmed to move the rails until it contacts the foam layer. The adjustable rail assembly 254 holds the foam as it is transported to the base corner datum. The gripping assemblies 280 are then activated and the foam layer is stretched to its nominal size, which matches the length and width dimensions of the innercore unit and bucket assembly. The lifting assembly 206 is then robotically lowered onto the foam layer and the lifting units incorporating needles are activated to engage the foam layer. The foam layer at its nominal size is then placed onto the innercore unit and bucket assembly using the base corner datums as a reference point to provide precise placement of the foam layer.

Advantageously, the sizing function may incorporate variable compression forces, variable stretching forces, and clamping based on the foam type with real time adjustments to achieve the intended functional value desired. Consequently, sizing of the foam layer will reduce process variability by providing consistency in terms of the size and precise placement of the foam layer onto the previously aligned and known position of the innercore unit and bucket assembly.

Compression Station

Figure 17:
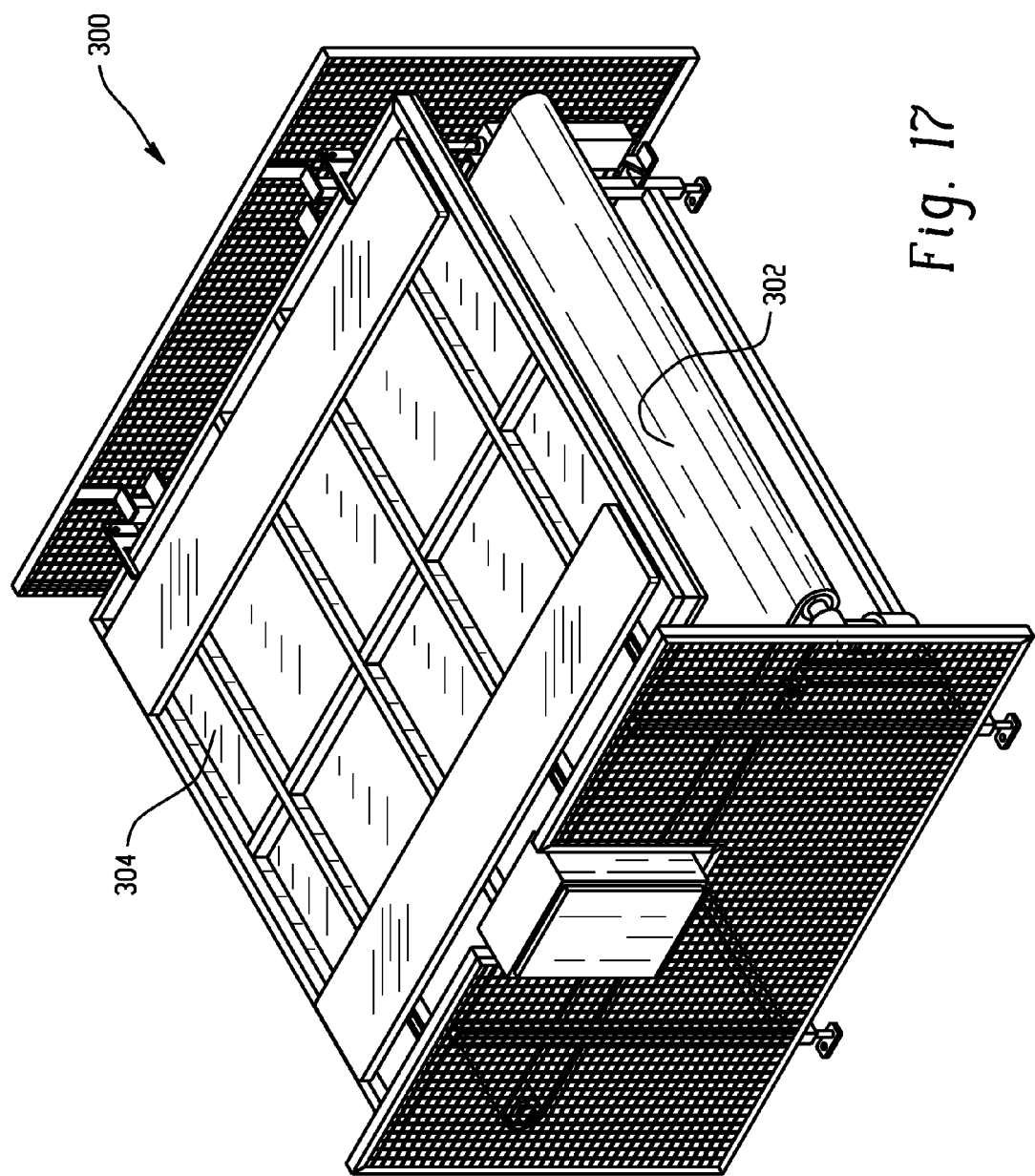
FIG. 17 depicts a perspective view and an end on view, respectively, of a compression station utilized in the apparatus of FIG. 3.
Figure 18:
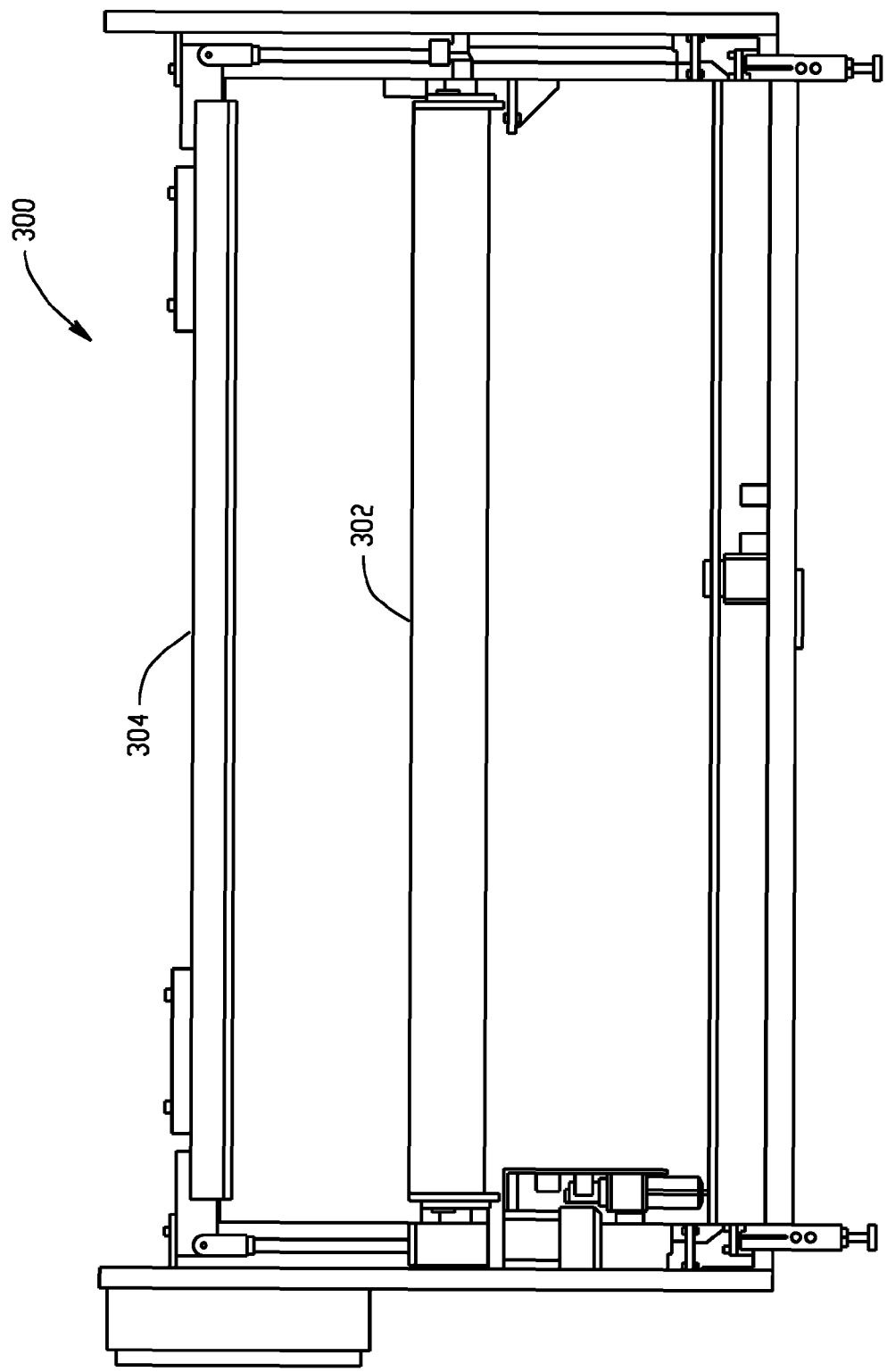
FIG. 18 also depicts a perspective view and an end on view, respectively, of a compression station utilized in the apparatus of FIG. 3.

As shown in FIGS. 17-18, the compression station 300 generally includes a support surface 302 coplanar and serially connected to the support surface of the alignment station 150. The support surface 302 may include a movable support surface for transferring the innercore unit and bucket assembly with the foam layer(s) thereon into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station.

The compression station 300 further includes a vertically movable platen 304 disposed above the support surface. The platen 304 may be driven by actuators (not shown), e.g., pneumatic actuators, hydraulic actuators, or the like that move the platen vertically upward and downward such that when the innercore unit and bucket assembly having the foam layers disposed therein are transferred to the compression station, the platen is lowered to compress the assembly. The compression of the assembly provides a predetermined and programmed pressure on the assembly to provide consistent and uniform downward pressure across the surface of uppermost foam layer, which serves to maximize contact of the adhesive between the various layers, thereby minimizing the amount of adhesive used compared to the prior art as well as providing reproducibility with regard to adhesive strength.

The platen 304 has a substantially planar surface that contacts the surface of the uppermost foam layer. The platen is generally dimensioned such that the substantially planar surface can be configured to provide a constant pressure across the entire surface of whatever size foam layer the platen contacts. As such, the platen is generally dimensioned to be larger than the largest size mattress being assembled. The substantially planar surface may be formed of a single piece construction or may be formed of plates. In some embodiments, the individual plates may be independently actuatable so as to exert differing pressures as may be desired in some applications.

Programmable Logic Control and Manufacturing Execution System

As noted above, the apparatus can be fully automated via a programmable logic control and/or manufacturing execution solution system (i.e., the PLC/MES system) using a radio frequency identification tag (RFID) for component identification. By way of example, RFID tags may be affixed to the innercore unit and bucket assembly and/or foam layers and/or storage areas corresponding to the particular component for wireless recognition by the PLC/MES system. In this manner, orders can be managed and scheduled from the PLC/MES system. Still further, each of the various steps for placing and securing the foam layers onto the innercore unit and bucket assembly can be fully automated via the programmable logic control/manufacturing execution solution system, thereby requiring no operator interaction. Use of RFID tags for component identification enhances changeovers and allows for simple correction for variation between different innercore and bucket assembly types as well as different foam layer types.

The Process

Figure 19:
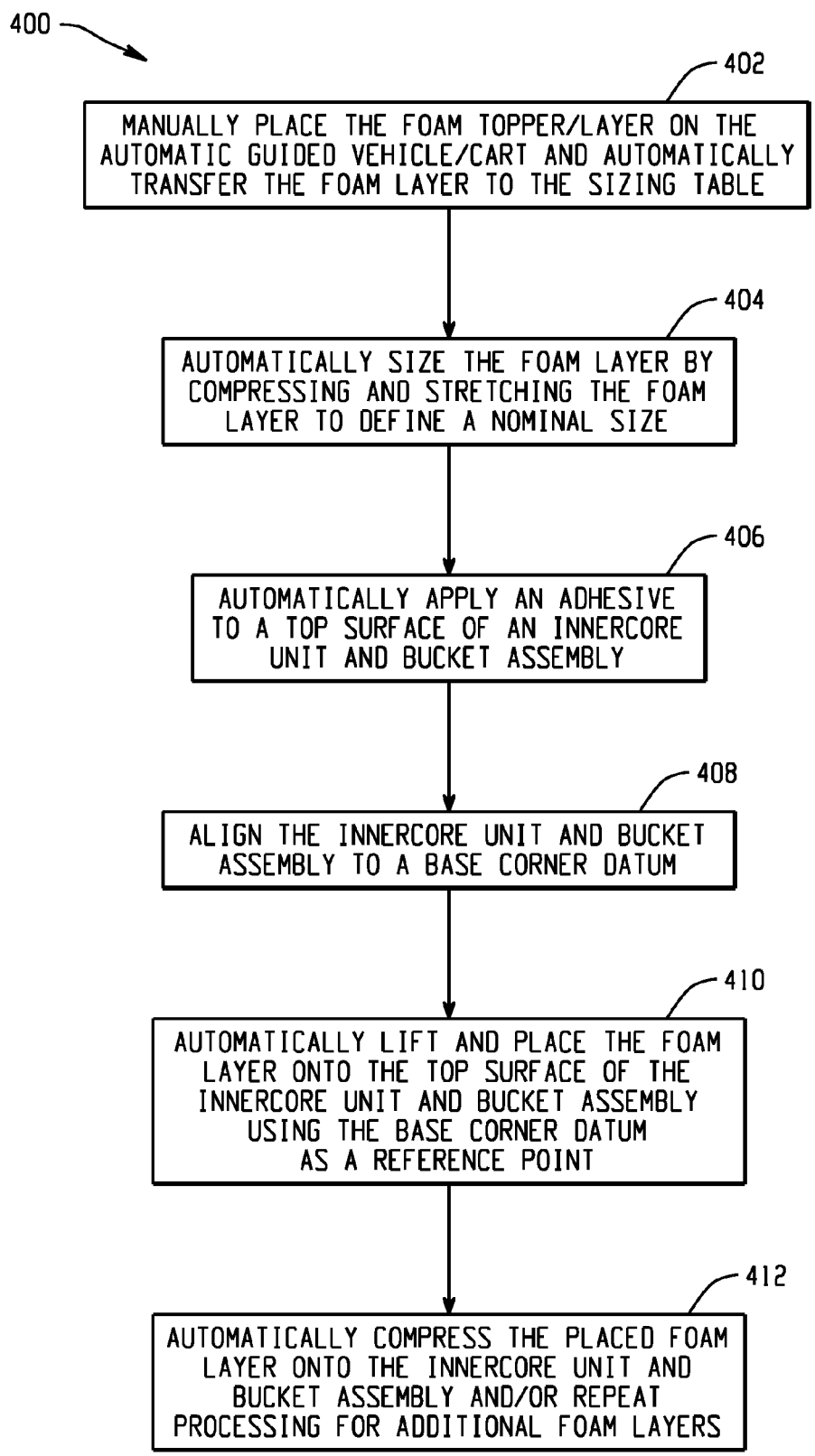
FIG. 19 illustrates an exemplary process flow for assembling a foam topper layer(s) onto an innercore unit and bucket assembly in accordance with the present disclosure.

Turning now to FIG. 19, the process 400 of operating the apparatus 50 generally includes a first step 402 of delivering a foam layer to the robotic foam layer sizing and robotic transfer station 200. This step is automatically performed. For example, an operator manually places the foam on the automated guide vehicle which can be programmed to automatically locate and transfer a desired foam layer to the sizing and transfer station. The foam layer is then sized in the sizing station, which first compresses and then stretches the foam layer to a nominal size as shown in step 404.

Prior to or simultaneously with the location and sizing of the foam layer, an innercore and bucket assembly is provided to the adhesive application station 100 as shown in step 406. In one embodiment, the innercore unit and bucket assembly can be directly fed from an innercore unit and bucket assembly apparatus. An exemplary innercore unit and bucket assembly apparatus is disclosed in U.S. patent application Ser. No. 14/481,419 entitled: Mattress Manufacturing Process and Apparatus to Michael DiMarco and filed on Sep. 9, 2014, incorporated herein by reference in its entirety. For example, the innercore unit and bucket assembly can be transferred to the conveyor of the adhesive application station where a predetermined pattern and volume of adhesive is then applied to the top surface. The innercore unit and bucket assembly with the applied adhesive is then transferred to the alignment station 150 for alignment. All four sides are aligned as shown in step 408, wherein the coordinates are provided to the programmable logic control system.

The foam layer at the nominal size is then picked up from the foam layer sizing and robotic transfer station 200 and placed on the top surface of the aligned inner core unit and bucket assembly as shown in step 410. In this manner, the foam layer is precisely placed on the top surface of the innercore unit and bucket assembly (or previously deposited foam layer) and onto a controlled amount and defined pattern of adhesive. The process is then repeated until all foam layers for the mattress design build are placed as provided in step 412.

Subsequent to foam placement on the innercore and bucket assembly (or previously deposited foam layer), the assembly is transferred to the compression station, wherein downward pressure is applied onto the assembly to insure maximum and consistent adhesion of the foam layer to the innercore unit and bucket assembly. In situations where multiple foam layers are placed, the programmable logic control system may be programmed to provide the step of compression after each foam layer is adhesively placed, after selected foam layers are placed, or after all of the layers are placed. The system provides latitude as to when this may occur.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for applying an adhesive to a top surface of an innercore unit and bucket assembly, comprising:
    transferring the innercore unit and bucket assembly onto a planar conveying surface of an adhesive application station;
    moving the planar conveying surface carrying the innercore unit and bucket assembly along a travel path;
    detecting a leading edge of the innercore unit and bucket assembly with a sensor;
    automatically spraying a controlled amount of an adhesive in a defined pattern onto the top surfaces of the innercore unit and bucket assembly beginning at the leading edge to a trailing edge, wherein automatically spraying the controlled amount of the adhesive comprises discharging the adhesive from a bridge spanning across the travel path, wherein the bridge comprises a plurality of spray nozzles movable across the bridge in fluid communication with a source of the adhesive, wherein the plurality of spray nozzles are located on the bridge;

adjusting the controlled amount of adhesive based on density and hardness properties of a foam layer providing the top surfaces;

detecting the trailing edge of the innercore unit and bucket assembly; and discontinuing the spraying of the adhesive.

2. The process of claim 1, wherein the adhesive is a hot melt adhesive.

3. The process of claim 1, wherein the sensor is a motion sensor.

4. The process of claim 1, wherein transferring the innercore unit and bucket assembly onto the planar conveying surface comprises moving the innercore unit and bucket assembly onto the planar conveying surface carried by an automated guide vehicle, wherein the planar conveying surface of the automated guide vehicle is coplanar to the planar conveying surface of the adhesive application station.

5. The process of claim 1, the innercore unit comprises a plurality of coil springs.

6. The process of claim 1, wherein moving the planar conveying surface comprises varying a speed of the planar conveying surface to tailor a feed rate of the adhesive onto the innercore unit and bucket assembly.

7. The process of claim 1, further comprising vertically moving the bridge spanning across the travel path to a defined height above the planar conveying surface prior to automatically spraying the controlled amount of the adhesive.

8. The process of claim 1, further comprising statically positioning the plurality of spray nozzles when automatically spraying the controlled amount of the adhesive.

9. The process of claim 1, further comprising dynamically positioning the plurality of spray nozzles when automatically spraying the controlled amount of the adhesive.

* * * * *